US009315270B2

(12) United States Patent
Dryburgh et al.

(10) Patent No.: US 9,315,270 B2
(45) Date of Patent: *Apr. 19, 2016

(54) AIRCRAFT PASSENGER SEATING ARRANGEMENT

(71) Applicant: Acumen Design Associates Limited, London (GB)

(72) Inventors: Ian Hamilton Dryburgh, London (GB); John David Henry McKeever, London (GB); Ali Ersan, London (GB)

(73) Assignee: ACUMEN DESIGN ASSOCIATES LIMITED, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/628,878

(22) Filed: Feb. 23, 2015

(65) Prior Publication Data
US 2015/0166184 A1    Jun. 18, 2015

Related U.S. Application Data

(63) Continuation of application No. 14/245,962, filed on Apr. 4, 2014, now Pat. No. 8,998,139, which is a continuation of application No. PCT/GB2013/052517, filed on Sep. 26, 2013.

(30) Foreign Application Priority Data

Sep. 27, 2012   (GB) .................................. 1217319.1

(51) Int. Cl.
*B64D 11/00*   (2006.01)
*B64D 11/06*   (2006.01)

(52) U.S. Cl.
CPC ............ *B64D 11/0601* (2014.12); *B64D 11/06* (2013.01); *B64D 11/0604* (2014.12); *B64D 11/0641* (2014.12)

(58) Field of Classification Search
CPC ........... B64D 11/0601; B64D 11/0604; B64D 11/0641; B64D 11/06
USPC ....................................................... 244/118.6
See application file for complete search history.

(56) References Cited

U.S. PATENT DOCUMENTS

| 7,578,470 B2 | 8/2009 | Plant |
| 7,918,504 B2 | 4/2011 | Thompson |

(Continued)

FOREIGN PATENT DOCUMENTS

| DE | 102010019192 A1 | 11/2011 |
| FR | 2994547 A1 | 2/2014 |

(Continued)

OTHER PUBLICATIONS

Search Report mailed Jan. 25, 2013, in Great Britain Application No. 1217319.1.

(Continued)

*Primary Examiner* — Timothy D Collins
*Assistant Examiner* — Jessica Wong
(74) *Attorney, Agent, or Firm* — Hauptman Ham, LLP

(57) ABSTRACT

A passenger seating arrangement in an aircraft cabin, comprising a plurality of pairs of seat units, the pairs of seat units being located directly behind one another, and each seat unit having a longitudinal axis. Each pair of seat units comprises an aisle-seat unit and a non-aisle-seat unit. The longitudinal axes of the non-aisle-seat units are arranged in-line with one another, and the longitudinal axis of the aisle-seat unit of each pair of seat units is angled so as to provide a passenger access path linking the non-aisle-seat unit of a pair, with the aisle.

18 Claims, 28 Drawing Sheets

(56) References Cited

U.S. PATENT DOCUMENTS

| | | |
|---|---|---|
| 8,196,864 B2 | 6/2012 | Ruiter et al. |
| 8,201,885 B2 | 6/2012 | Thompson |
| 8,382,036 B2 | 2/2013 | Ruiter et al. |
| D696,524 S | 12/2013 | Ersan et al. |
| 2007/0241235 A1 | 10/2007 | Atchison |
| 2007/0246981 A1 | 10/2007 | Plant |
| 2010/0065684 A1 | 3/2010 | Ruiter et al. |
| 2012/0223186 A1 | 9/2012 | Henshaw |
| 2012/0292957 A1 | 11/2012 | Vergnaud et al. |
| 2012/0305705 A1 | 12/2012 | Vergnaud et al. |
| 2013/0032668 A1 | 2/2013 | Foucher et al. |
| 2013/0068887 A1 | 3/2013 | Ko |
| 2013/0106156 A1 | 5/2013 | Orson et al. |

FOREIGN PATENT DOCUMENTS

| | | |
|---|---|---|
| GB | 2326824 A | 1/1999 |
| WO | 0021831 A2 | 4/2000 |
| WO | 03013903 A1 | 2/2003 |
| WO | 2005014395 A1 | 2/2005 |
| WO | 2006054064 A1 | 5/2006 |
| WO | 2007003889 A1 | 1/2007 |
| WO | 2007072045 A2 | 6/2007 |
| WO | 2008072328 A1 | 6/2008 |
| WO | 2009073244 A1 | 6/2009 |
| WO | 2011067286 A2 | 6/2011 |
| WO | 2011141134 A1 | 11/2011 |
| WO | 2013136080 A2 | 9/2013 |
| WO | 2013142181 A1 | 9/2013 |
| WO | 2013144935 A2 | 10/2013 |

OTHER PUBLICATIONS

International Search Report mailed Feb. 11, 2014, in International Application No. PCT/GB2013/052517, filed Sep. 26, 2013.

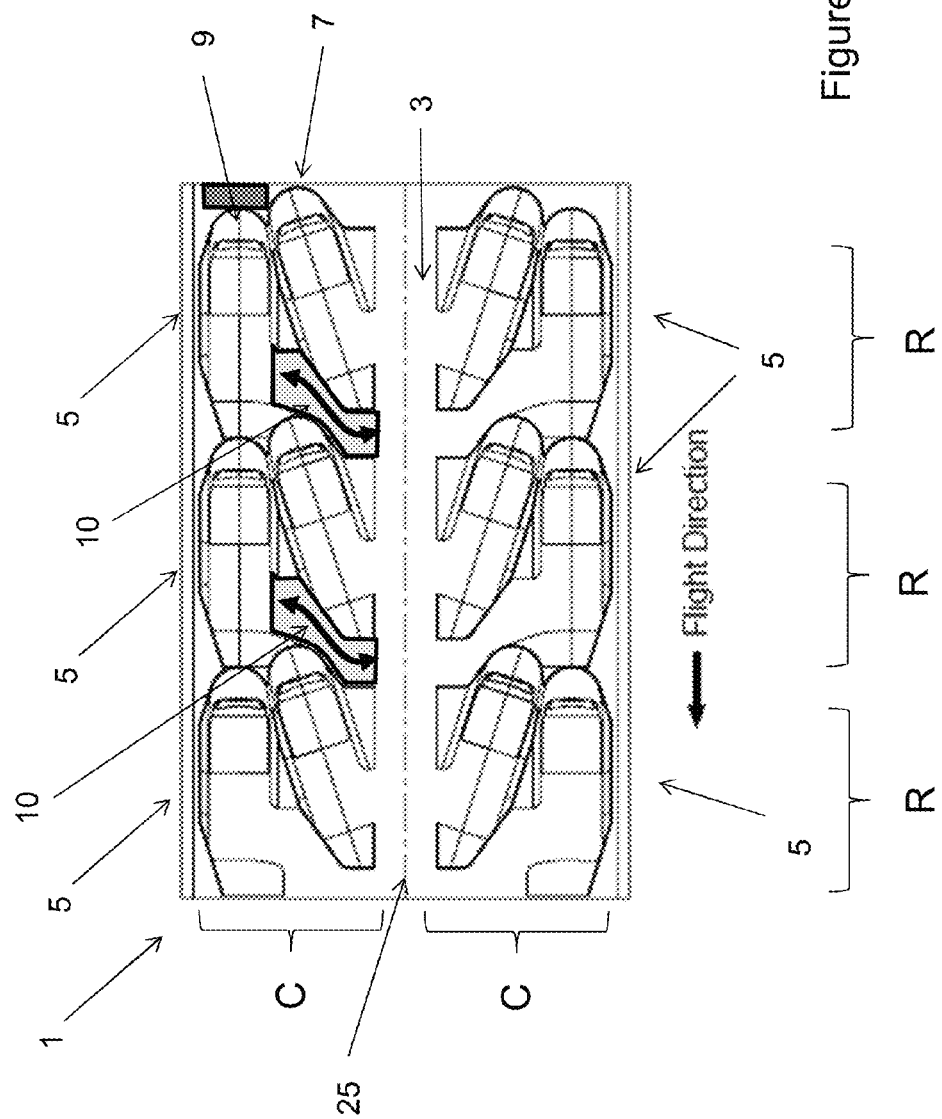

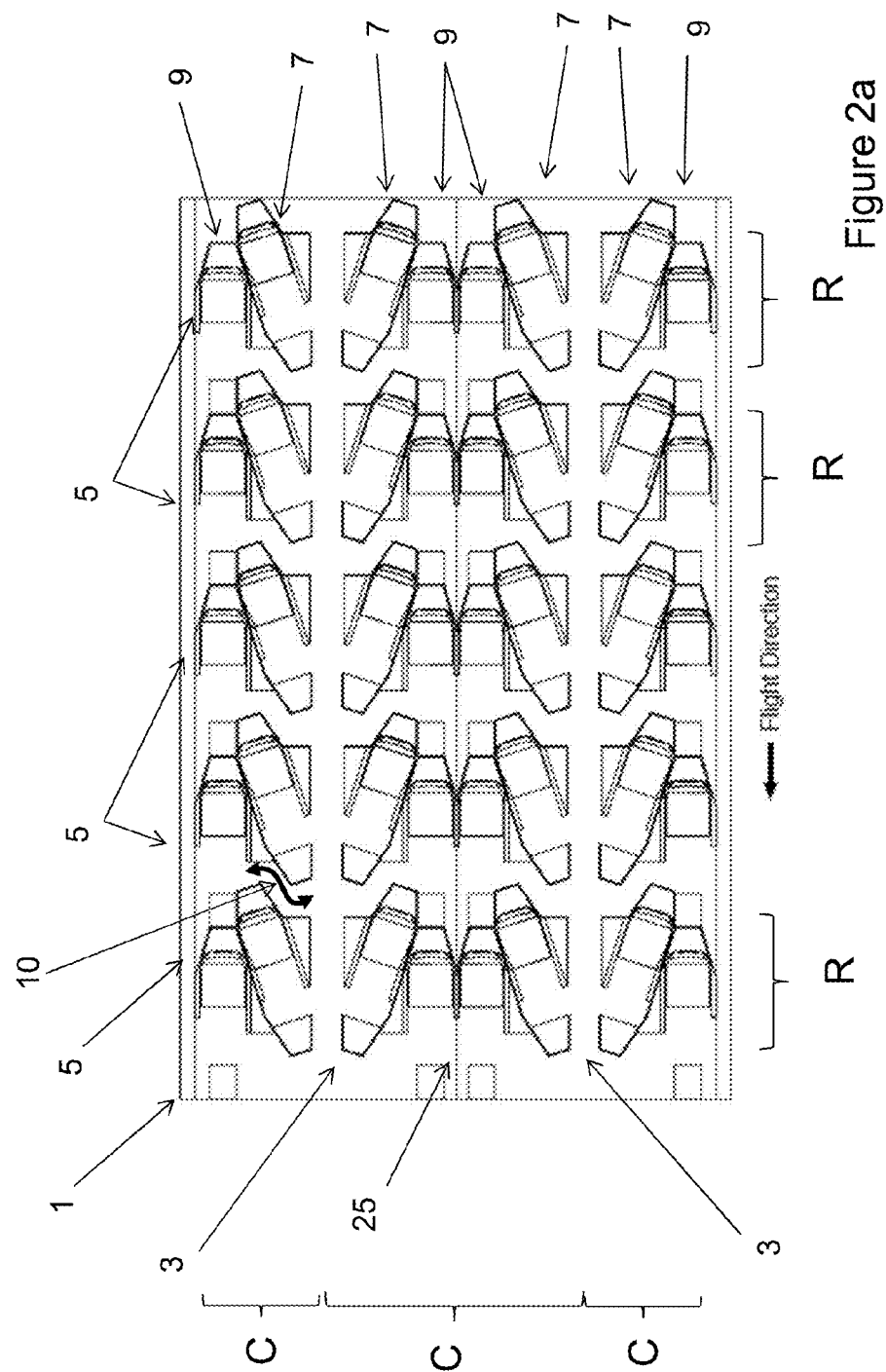

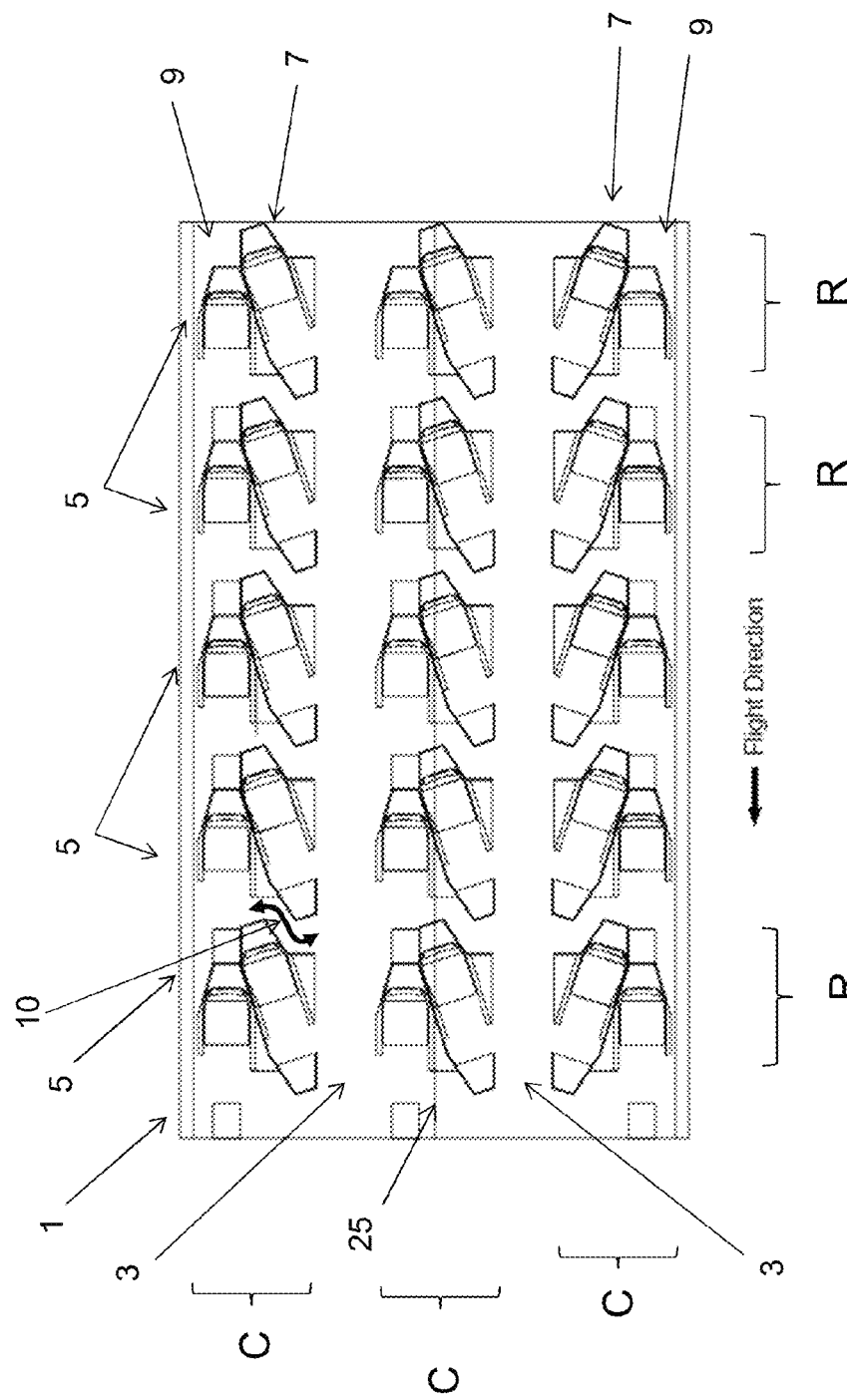

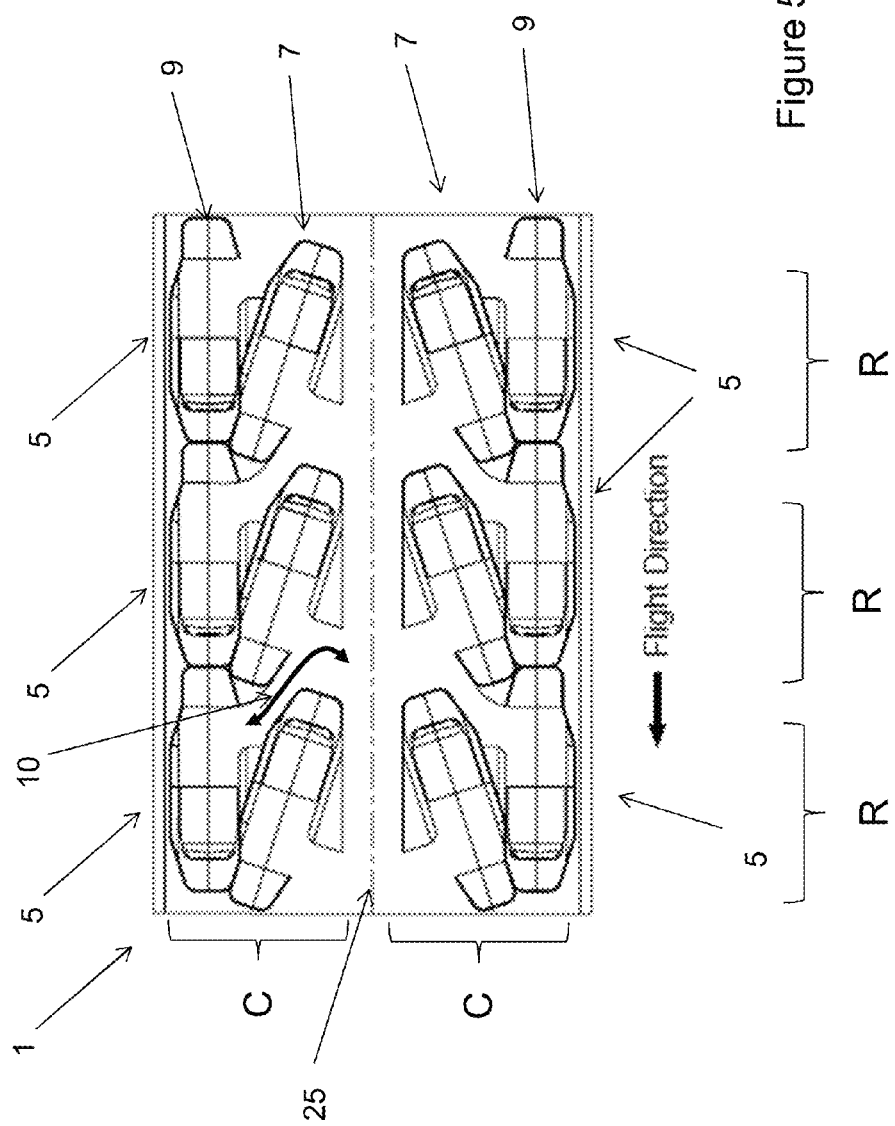

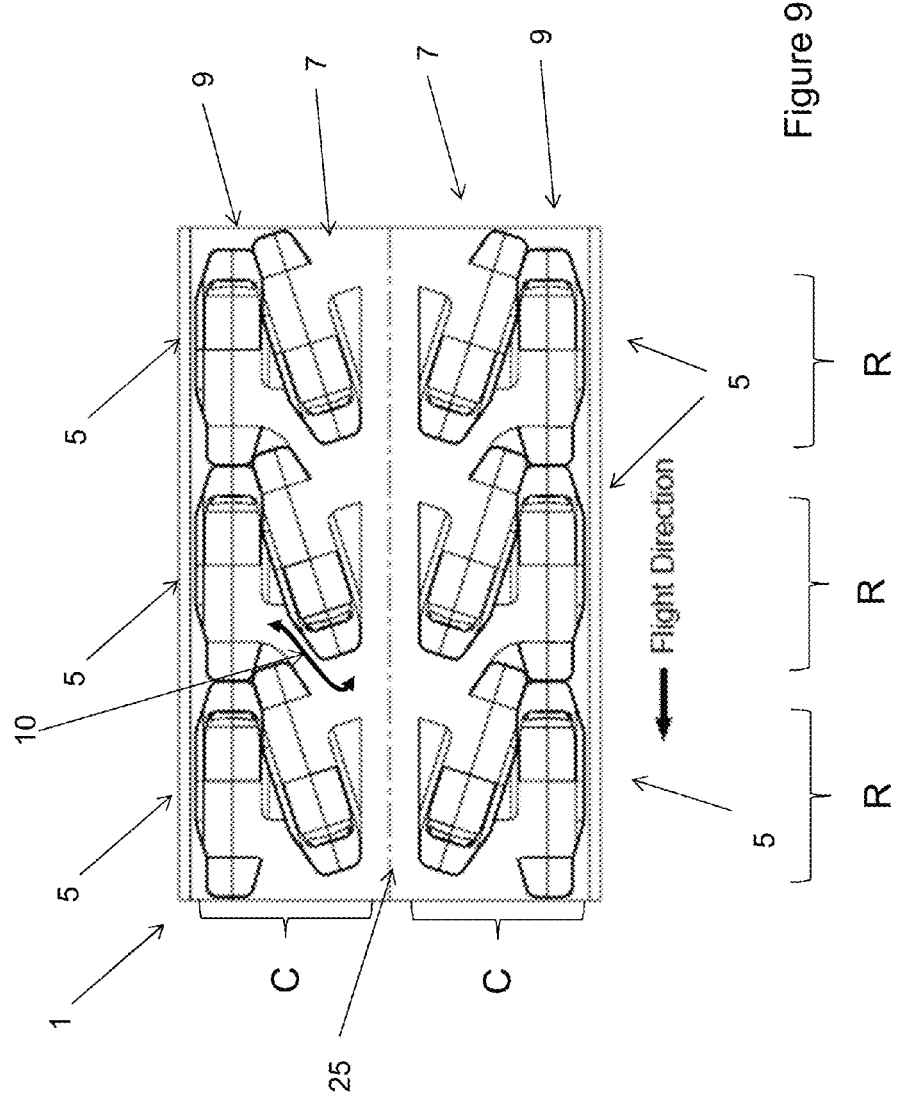

AIRCRAFT PASSENGER SEATING ARRANGEMENT

CROSS-REFERENCE TO RELATED APPLICATIONS

This application is a Continuation of U.S. application Ser. No. 14/245,962, filed Apr. 4, 2014, which is a "bypass" Continuation of the International Application No. PCT/GB2013/052517, filed Sep. 26, 2013, which claims priority from GB Application No. GB1217319.1, filed Sep. 27, 2012. The entire contents of the above-listed applications are incorporated by reference herein.

TECHNICAL FIELD

The present invention relates to an aircraft passenger seating arrangement, and to an aircraft passenger seat assembly for use in such a passenger seating arrangement.

BACKGROUND OF THE INVENTION

Aircraft seating arrangements in which seat units face in a direction parallel to the longitudinal axis of the aircraft, and are arranged in-line with one another are well known and are still commonly found in economy class seating. Various seating arrangements that seek to more efficiently pack seat units have been suggested. In recent years, there has been a particular focus towards efficiently packing convertible seat units that have both a seat configuration, and a bed configuration. These convertible seat units are typically provided in business class or first class cabins of an aircraft. In the seat configuration, the seat unit typically provides a relatively upright seat, whereas in the bed configuration, the seat unit tends to form a substantially planar surface for supporting the passenger. The seat units shown in GB2326824 (British Airways) and WO03013903 (Virgin Atlantic) are examples of such convertible seat units (often referred to as having 'lie-flat' seats) that have both a neat configuration, and a flat-bed configuration which offers improved comfort over a reclined seat. Lie-flat seats have been increasingly popular over the lass decade or so.

GB2326834 and WO03013903 mentioned above are examples of so-called herringbone arrangements in which the seats are at an angle to the longitudinal axis of the aircraft. By angling the seat units in such a way, the packing efficiency may be increased. Some examples of other suggested seating arrangements are described below:

U.S. Pat. No. 7,918,504 (Thompson) discloses an aircraft cabin in which there are rows of seat units, each unit having a forward facing lie-flat seat that laces in a direction parallel to the longitudinal axis of the cabin. Successive rows of seats are staggered in a transverse direction such that a console between two seat units in one row, is directly in front of a seat unit in the row behind. The console provides an enclosed foot-well for that rear seat unit.

WO 2009/073244 (BE Aerospace) discloses an aircraft cabin in which pairs of seat units are angled outwardly to the longitudinal axis of the cabin by about 15 degrees. As with U.S. Pat. No. 7,918,504 the feet of a passenger in one seat unit may be accommodated in a foot-well that is located between the two seat units in the row in front.

WO0021831 (BritishAirways) discloses a seating arrangement in which the seats are all orientated parallel to the longitudinal axis of the aircraft and in-line with the seat units of the adjacent row. However, pairs of neighbouring seat units in a row face in opposite directions. When converted into a bed configuration, the lens of an occupant of one seat may be placed in an extension space that extends over the seating space of the adjacent (oppositely facing) seat. WO2007072045 discloses a similar arrangement of rows of in-line seat units that face opposite directions.

Privacy and the clear ownership of personal space are becoming an increasingly important, issue with passengers. Whilst many of the above-mentioned arrangements may improve the packing efficiency of the seat units, they may afford relatively low levels of privacy, in particular, where the seat unit are arranged in rows of two or more adjacent, seats, the passenger of a non-aisle-seat tends to need to step over part of the adjacent seat unit (e.g. part of the flat bed when the seat is in a bed configuration) in order to access/exit their seat unit. This can detrimentally affect the feeling of privacy and personal space for the passengers in one or both of the relevant seat units. Some arrangements have been proposed that increase the personal space available (for example by having the seat units far apart). WO02011/141134 (Recaro) discloses an arrangement of spaced-apart groups of seats, in which each group has a central seat unit that is offset with respect to at least one adjacent, outer seat unit; as a result of this offset the central seat unit has obstacle free access to at least one cabin aisle. Such arrangements tend to come at the cost of the packing efficiency being reduced. It is desirable to increase the feeling of privacy and personal space for the passengers, but without detrimentally affecting, and more preferably whilst improving, the packing efficiency of the seating.

SUMMARY OF THE INVENTION

According to a first aspect of the invention, there is provided a passenger seating arrangement in an aircraft cabin, the seating arrangement comprising a plurality, and more preferably a multiplicity, of pairs of seat units, the pairs of seat units being located directly behind one another, each seat unit having a longitudinal axis, and each pair of seat units comprising an aisle-seat unit bordering an aisle to one side, and a non-aisle-seat unit positioned to the other side of the aisle-seat unit, and wherein the longitudinal axes or the non-aisle-seat units are arranged in-line with one another, and the longitudinal axis of the aisle-seat unit of each pair of seat units is angled relative to the longitudinal axis of the non-aisle-seat unit, so as to provide a passenger access path linking the non-aisle-seat unit of a pair, with the aisle. The present invention recognizes that by having the non-aisle-seat units in-line, but the aisle-seat units angled in the claimed manner, a passenger access path linking the non-aisle-seat unit with the aisle can be provided. The passenger access path preferably does not intersect the aisle-seat unit, thereby facilitating a feeling of privacy and personal space for the passengers.

The passenger access path preferably passes between the aisle-seat units in adjacent rows of pairs of seat units. The passenger access path may be defined between the aisle-seat units in adjacent rows of pairs of seat units. The passenger access path may be at least partially defined between a first end of one aisle-seat unit and the opposing end of another aisle-seat unit in the adjacent rows. At least part of the passenger access path may be angled relative to the longitudinal axis of the non-aisle-seat unit. At least part of the passenger access path may be angled such that it is approximately parallel to the longitudinal axis of the aisle seat unit.

Each seat unit preferably comprises a head-receiving end and a foot-receiving end. The sides of the seat unit preferably extend between the head-receiving end and the foot-receiving end of the seat unit. The sides of the seat unit, typically extend, in a direction generally parallel to the longitudinal axis of the seat unit.

Each, seat unit may comprise a passenger supporting surface for supporting the passenger during use of the seat unit. The passenger supporting surface preferably extends between a foot-receiving end and a head-receiving end. The passenger supporting surface may be formed from a plurality of moveable passenger bearing elements (such as a seat pan, back rest, and leg rest etc.) The passenger supporting surface of the aisle seat unit and the passenger supporting surface of the non-aisle-seat unit are preferably the same length. The passenger supporting surface of the aisle seat unit and the passenger supporting surface of the non-aisle-seat unit may be substantially the sane size and shape. In some embodiments of the invention, the aisle and non-aisle seat units may be the same length. In some embodiments of the invention, the aisle and non-aisle seat units may be substantially the same size said shape. In other embodiments of the invention, the aisle and non-aisle seat units may be a different length, size and/or shape.

The passenger supporting surface may be associated with a support structure for supporting the surface above the floor of the aircraft cabin. The support structure may be attached to the floor of the aircraft cabin. The seat unit preferably comprises the support structure.

The seat unit may comprise a housing at least partially surrounding the passenger supporting surface. The housing may include at least one privacy screen (for example around one or both ends of the passenger supporting surface. The housing may at least partially define the shape of the seat unit. The length of a seat unit will be readily apparent to the skilled person. In embodiments in which the housing is present at both ends of the seat unit, the length of the seat unit (if not readily apparent) may be defined by the maximum distance, in the longitudinal direction, between the opposing parts of the housing.

The longitudinal axis of the seat unit preferably extends between the head-receiving end and the foot-receiving end. The longitudinal axis typically extends along the centreline of the passenger supporting surface (in the longitudinal direction with respect to that passenger supporting surface). The longitudinal axis of the aisle-seat units and/or of the non-aisle-seat units is preferably fixed.

The passenger access path may adjoin a side of the non-aisle seat. Indeed, embodiments of the invention may facilitate a relatively high packing efficiency because a passenger access space need no longer be provided between the adjacent rows of non-aisle-seats; this may allow the non-aisle-seat units to be closely spaced, and preferably arranged with minimal 'dead' space between them.

The aisle-seat unit is sufficiently angled such that a passenger access path linking the non-aisle-seat unit with the aisle is provided. The aisle seat units may be arranged such that, in the absence of the aisle-seat units being so angled, a passenger access path would not be provided. The pitch of the aisle-seat units may be less than a maximum pitch value. The maximum pitch value may be equal to the length of each aisle seat unit plus the minimum width of a pathway for a passenger to use.

The maximum pitch value may be equal to the length of each aisle seat unit, plus 50 cm. The maximum pitch value may be equal to the length of each aisle seat unit plus 30 cm. The maximum pitch value may be equal to the length of each aisle seat unit plus 9 inches (22.86 cm). The maximum pitch value may be equal to the length of each aisle seat unit plus 3 inches (22.86 cm). It will be appreciated that such arrangements do not preclude the pitch of the aisle-seat, units being less than or equal to the length of each aisle seat unit.

The width of the passenger access path may be dependent on the angle, of the aisle-seat units.

The longitudinal axis of the aisle-seat unit of each pair of seat units may foe angled, by at least 10 degrees relative to the longitudinal axis of the non-aisle-seat unit. The longitudinal axis of the aisle-seat unit of each pair of seat units may be angled by at least 15 degrees, relative to the longitudinal axis of the non-aisle-seat unit. The longitudinal axis of the aisle-seat unit of each pair of seat units is preferably angled by an acute angle relative to the longitudinal axis of the non-aisle-seat unit. The longitudinal axis of the aisle-seat unit of each pair of seat units may be angled by 45 degrees or less relative to the longitudinal axis of the non-aisle-seat unit.

The longitudinal axes of the non-aisle-seat units are preferably substantially parallel to the longitudinal axis of the cabin. The longitudinal axis of the non-aisle-seat units may be parallel to the longitudinal axis of the aircraft cabin.

As mentioned above, since the arrangement of the present intention facilitates a passenger access path linking the non-aisle-seat unit with the aisle, the need to provide space between adjacent rows of non-aisle seat units (for example in which the passenger of the non-aisle-seat would be able to manoeuvre himself onto the seat unit) is reduced or even removed. The distance (in the longitudinal direction) between adjacent rows of non-aisle seat units is preferably less than the minimum width of a pathway for a passenger to use.

The distance between adjacent rows of non-aisle seat units may be less than 50 cm, and more preferably less than 30 cm. The distance between adjacent rows of non-aisle seat units may be 9 inches (22.86 cm; or less. The distance between adjacent rows of non-aisle seat units may be 8 inches (20.32 cm) or less. The non-aisle seat units may be arranged substantially without any spacing between them. The pitch of the non-aisle-seat units may be less than, or substantially equal to, the length of the non-aisle-seat units. For example, in some embodiments the non-aisle-seat units may be arranged substantially end-to-end. In other embodiments the non-aisle seat units may overlap one-another (for example the leg-receiving end of one non-aisle seat unit may be located underneath the head-receiving end of the non-aisle seat unit in the row in front). By providing an arrangement in which the non-aisle-seat units are arranged close together (or overlapping) the amount of "dead space" between the seat units in each, row can be minimized, resulting in especially efficient, packing. Indeed, in embodiments of the present invention, there may only need to be such "dead space" in the front or rear row of seat units in a column.

In principle, the present invention may be applicable to any type of seat unit. For example the seat units may be configurable between an upright seat configuration and a reclined seat configuration such as those seat units often found in economy class. In such embodiments, the seat unit typically comprises a passenger supporting surface and a support structure but is less likely to comprise a housing, especially at the foot-receiving end of the passenger supporting surface. It will be appreciated that the length of the seat unit (if not readily apparent) may be defined by the distance between the maximum, foremost and maximum rearmost extent of the seat unit in any of these configurations.

The present invention may be especially beneficial for seat units that are arranged to be configurable between a seat and a bed. Each, seat unit may be configurable between a seating configuration and a bed, more preferably a flat-bed, configuration. Each seat unit may comprise one or more moveable elements that form part of a seating surface in the seat configuration and form, part of a bed surface in the bed configuration. The moveable elements may form the passenger supporting surface.

At least one of the seat units, and more preferably the passenger supporting surface of the seat unit, at at least one end, and preferably both ends, may be narrower than at the centre. For example, the end(s) of the seat units may be relatively narrow as a result of a step change in width, or may be tapered (for example into a curved, triangular, or trapezoidal shape). By shaping the seat unit, and/or passenger supporting surfaces, in any of the above-mentioned ways, the seat units may be arranged in a relatively space efficient manner. In particular, these embodiments of the invention, recognize that the full width of the seat unit is not necessary at its ends (due to the narrowness of a passenger's head and feet), and by narrowing the seat unit in at least one of these ends for an angled aisle seat unit, the unit need not protrude as far into the aisle. Alternatively or additionally, part of the angled aisle seat unit may be received adjacent the narrow region of she non-aisle-seat unit, thereby also reducing the total width of the pair of units.

The seat units within each pair of seat units may be shaped to tesseliate with each other. Each pair of seat units may be arranged so tesseliate with the non-aisle-seat unit of she pair of seat units behind.

The aisle-seat unit in each pair of seat units may be offset from the non-aisle-seat unit, such that the aisle-seas unit extends, or is extendable, beyond one end of the non-aisle-seat unit. Offset between the aisle and non-aisle seat units say be desirable in some embodiments (for example to set the longitudinal position of the passenger access past, relative to the non-aisle seat unit). There may be a notional space envelope extending outwardly either side of the non-aisle-seat in each pair, said space envelope having a length equal to the length of the non-aisle-seat unit. More than 50% of the length of the respective aisle-seat unit may be contained within that space envelope. In some embodiments, at least 60%, at least 65% or even at least 75% of the length of the respective aisle-seat unit may be contained within that space envelope. In some embodiments of the invention, over 80% of the length of the aisle-seat unit may be contained, within that space envelope.

In some embodiments of the invention, the aisle seat unit may extend, or be extendable, beyond one end of the non-aisle-seat unit (i.e. in the longitudinal direction), but not necessarily into the space behind it. In other embodiments of the invention, a notional space envelope, having a width, corresponding to the maximum, width of the non-aisle-seat unit, may extend, either end of each non-aisle-seat unit. The aisle-seat unit may be arranged to extend, or be extendable, into said notional space envelope of the respective non-aisle-seat unit. The passenger, supporting surface of the aisle-seat unit may be arranged to extend into a notional space envelope having a width corresponding to the maximum width of the passenger supporting surface of the non-aisle-seat unit, and extending either end of that non-aisle-seat unit. These arrangements have been found to provide a particularly efficient use of space because some of the length of the aisle-seat unit (such as the foot or head receiving end) may be accommodated in the space behind the non-aisle-seat unit, thereby reducing the overall width of the pair of seat units. In some embodiments of ties invention, part of the seat unit may be permanently present in the space behind the non-aisle-seat unit (i.e. the part extends info that space). For example, in some embodiments of the invention part of a fixed ottoman, or a shroud, may extend into the space. This is especially the case (but not necessarily exclusively so) for lie-flat, seat units, in other embodiments of the invention, each seat unit may comprise one or more moveable elements that are extendable into the space, for example when the seat unit moves from a seating configuration to a reclined or bed configuration, part of the seat unit many move into the space.

In some embodiments of the invention, the foot-receiving end of the seat unit may be open-topped. The foot-receiving end of the seat unit may comprise an open-topped ottoman. In other embodiments of the invention the foot-receiving end of the seat unit, especially the non-aisle-seat unit, may be covered. For example the foot receiving end may be received in part of the seat unit in the row in front. In other embodiments, the foot receiving end may be covered by an ancillary support surface. The ancillary support surface may be for use by a passenger in the adjacent seat unit, for example as a table or alike.

All the non-aisle-seat units preferably face in the same direction. For example the non-aisle-seat units may be forward facing. All the aisle-seat units preferably face in the same direction (which may or may not be the same direction that the non-aisle-seat units face). Each of the pairs of seat units may be substantially identical.

In some embodiments of the invention, the aisle- and the non-aisle-seat, units are substantially forward facing. In such embodiments, the aisle-seat units sure preferably angled outwardly relative to the non-aisle-seat units. The head-receiving ends of the seat units in each pair may be proximal to one another, and the foot-receiving ends of the seat units in each pair may be distal from one another. The parts of the aisle-seat unit bordering the aisle (for example the ottoman) are preferably at a height from the floor of less than the maximum height permitted by the FAA regulations (currently 21 inches (~635 mm) for a minimum aisle width (currently no less than 15 inches (~381 mm)). In embodiments in which the aisle-seat unit is angled such that the (typically wider) head-receiving ends of the seat units in each pair are proximal to one another, and the icon-receiving ends of the seat units in each pair are distal from one another, enables the relatively low parts of the aisle seat unit (for example the ottoman) to border the aisle, therefore permitting a relatively narrow aisle width. The seat unit may comprise a table surface for use by the passenger. The table surface may borders the aisle and is preferably less than the maximum height permitted by the FAA regulations for a minimum aisle width.

In some embodiments of the invention, the aisle- and the non-aisle-seat units face in opposite directions. In such embodiments the aisle-seat units may be angled inwardly relative to the non-aisle-seat units. The head-receiving end of the non-aisle-seat, unit may be proximal to the foot-receiving end of the aisle-seat unit in each pair. At least part of the foot-receiving end (for example a foot-receiving portion) of the aisle-seat unit may extend, or be extendable, into a region behind the non-aisle-seat unit. In other embodiments the aisle-seat units may be angled outwardly relative to the non-aisle-seat units. The foot-receiving end of the non-aisle-seat unit may be proximal to the head-receiving end of the aisle-seat unit in each pair. At least part of the head-receiving end (for example a head-receiving portion) of the aisle-seat unit may extend, or be extendable, into a region behind the non-aisle-seat unit.

The aircraft cabin may comprise a plurality of columns of the seating arrangement described herein. The aisle may be a central aisle extending along the centre of the cabin and the cabin may comprise at least two columns of the seating arrangement extending either side of the aisle. The aircraft cabin may comprise only two columns of the seating arrangement extending either side of a central aisle (a 2-2 configuration). This may be especially beneficial on narrow-bodied aircraft. The pairs of seat units may be adjacent an aircraft sidewall. The cabin comprising such seat units may be in a 2-2 configuration. The cabin comprising such seat units may be in a 2-X-2 configuration.

The aircraft cabin may comprise two columns of the seating arrangement extending either side of a central column of seat units (for example a 2-X-2 configuration). These arrangements may be more beneficial on wide-bodied aircraft. The central column of seats may, in principle be formed of any type of seating arrangement. More preferably however, the central column comprises a seating arrangement according to the present invention. In embodiments of the invention in which each row in the central column comprises 3 or 4 seats, the non-aisle-seat units may be in the centre of the centre column and the aisle-seat units are on the outside of the column. In another embodiment of she invention, each row in the central column comprises only a pair of seat units as described herein. Although, in that embodiment, both seat units in the pair of seat units border the aisle, it may be beneficial to still use such a seating arrangement because of the space saving advantages described herein and for consistency of the seating configuration. The seat units in the cabin are preferably substantially symmetrical about the longitudinal axis of the cabin.

Passenger access paths are preferably provided to link the non-aisle-seat unit of each pair, with the aisle. However, in some embodiments of sue invention, a passenger access path may be provided to link the non-aisle-seat unit of only one, or some, of the pairs, with the aisle. For example, in some embodiments of a X-3-X configuration, the pair of seat units down one side of the central column could only have a passenger access path to the adjacent aisle on alternate pairs of units; for the alternate units which do not have a passenger access path from that side, a path to the non-aisle-seat unit may be provided on the other side of the central column from, the other aisle. In preferred embodiments of such arrangements, the aisle-seat units are still angled, but the space that would have been the passenger access path may instead be occupied. For example it may be fitted with additional cabin furniture such as a table top.

According to another aspect of the invention, there is provided a seating assembly for use in the seating arrangement in the aircraft cabin as described herein. The seating assembly may comprise a pair of seat units, each seat unit having a longitudinal axis, and the pair of seat units comprising a first seat unit for bordering an aisle to one side, and a second seat unit positioned to the other side of the first seat unit, and wherein the second seat unit is adapted to be installed in the cabin such that the longitudinal axis of the second seat unit is in-line with the longitudinal axis of a second seat unit of a corresponding seat assembly in an row directly behind the seat assembly, and the longitudinal axis of the first seat unit is angled relative to the longitudinal axis of the second seas unit for providing a passenger access path for linking the second seat unit with the aisle.

According to another aspect of the invention, there is provided a passenger seating arrangement in an aircraft cabin, the seating arrangement comprising a pair of seat units, each seat unit having a longitudinal axis, and each pair of seat units comprising a first seat unit and a second seat unit positioned to one side of first, seat unit. The longitudinal axis of the second seat unit may be substantially parallel to the longitudinal axis of the cabin. The longitudinal axis of the first seat unit is angled, relative to the second seat unit. The cabin may comprise a plurality of such pairs of seat units, the pairs of seat units being located directly behind one another. The longitudinal axes of the second seat units may be parallel with one another. The longitudinal axes of the second seat, units may be substantially in-line with one another. Alternatively, the longitudinal axes of the second seat units may be parallel but not in-line with one another. The first, seat unit may border an aisle to one side. The second seat unit may be positioned to the other side of the aisle-seat unit. The second seat unit may be angled so as to provide a passenger access path linking the first seat unit wish the aisle.

According to yet another aspect of the invention, there is provided an arrangement in an aircraft cabin, the seating arrangement comprising a first column of seat units and a second column of seat, units adjacent thereto, the first column or seat units comprising a plurality of seat units arranged in-line with one another. There may be substantially no spacing between the seat units. The second column of seat units may comprise a plurality of seat units angled to the longitudinal axis of the first column. A passenger access path may pass between each of the seat, units in the second column to link the first column with the other side of the second column.

According to yet another aspect of the invention, there is provided an arrangement in an aircraft cabin, the seating arrangement comprising a first column of seat units and second and third columns of seat units either side thereof and adjacent thereto, the second and third columns of seat units each being bordered by the first column on one side and a respective aisle on the other side. The first column of seat units comprises a plurality of seat units arranged in-line with one another. The second column of seat units comprises a plurality of seat units angled, to the longitudinal axis of the first column, and the third column cut seat units comprise a plurality of seat units angled to the longitudinal axis of the first column in the opposite sense. A passenger access path passes between alternate seat units in the second column to link the first, column with the aisle adjacent to the second column. A passenger access path passes between alternate seat units in the third column to link the first column with the aisle adjacent to the third column. The passenger access paths in the second and third columns are preferably offset from one another in the longitudinal direction. The offset may be substantially equal to the pitch of a non-aisle-seat unit.

It will be appreciated that any features described with reference to one aspect of the invention are equally applicable to any other aspect of the intention, and vice versa. It will also be appreciated that reference above to one or score features of a seat unit tray be applicable to airy or all of the seat units described herein.

DESCRIPTION OF THE DRAWINGS

Various embodiments of the invention will now be described, by way of example only, with reference to the accompanying schematic drawings of which:

FIG. 1a is a plan view of a seating arrangement according to a first embodiment or the invention;

FIG. 1b is a plan view of two of the seating assemblies in FIG. 1a;

FIG. 2a is a plan view is a seating arrangement according to a second embodiment of the invention;

FIG. 2b is a plan view of three of the searing assemblies in FIG. 2a;

FIG. 3b is a plan view of three of the seating assemblies in FIG. 3a;

FIG. 4a is a plan view of a seating arrangement according to a fourth embodiment of the invention;

FIG. 5a is a plan view of a seating arrangement according to a fifth embodiment of the invention;

FIG. 5b is a plan view of two of the seating assemblies in FIG. 5a;

FIG. 6b is a plan view of three of the seating assemblies in FIG. 6a;

FIG. 7b is a plan view of three of the seating assemblies in FIG. 7a;

FIG. 9a is a plan view of a seating arrangement according to a ninth embodiment of the invention;

FIG. 9b is a plan view of two of the seating assemblies in FIG. 9a;

FIG. 10b is a plan view or three of the seating assemblies in FIG. 10a;

FIG. 11b is a plan view of three of the seating assemblies in FIG. 11a;

DETAILED DESCRIPTION

Figure 1B:
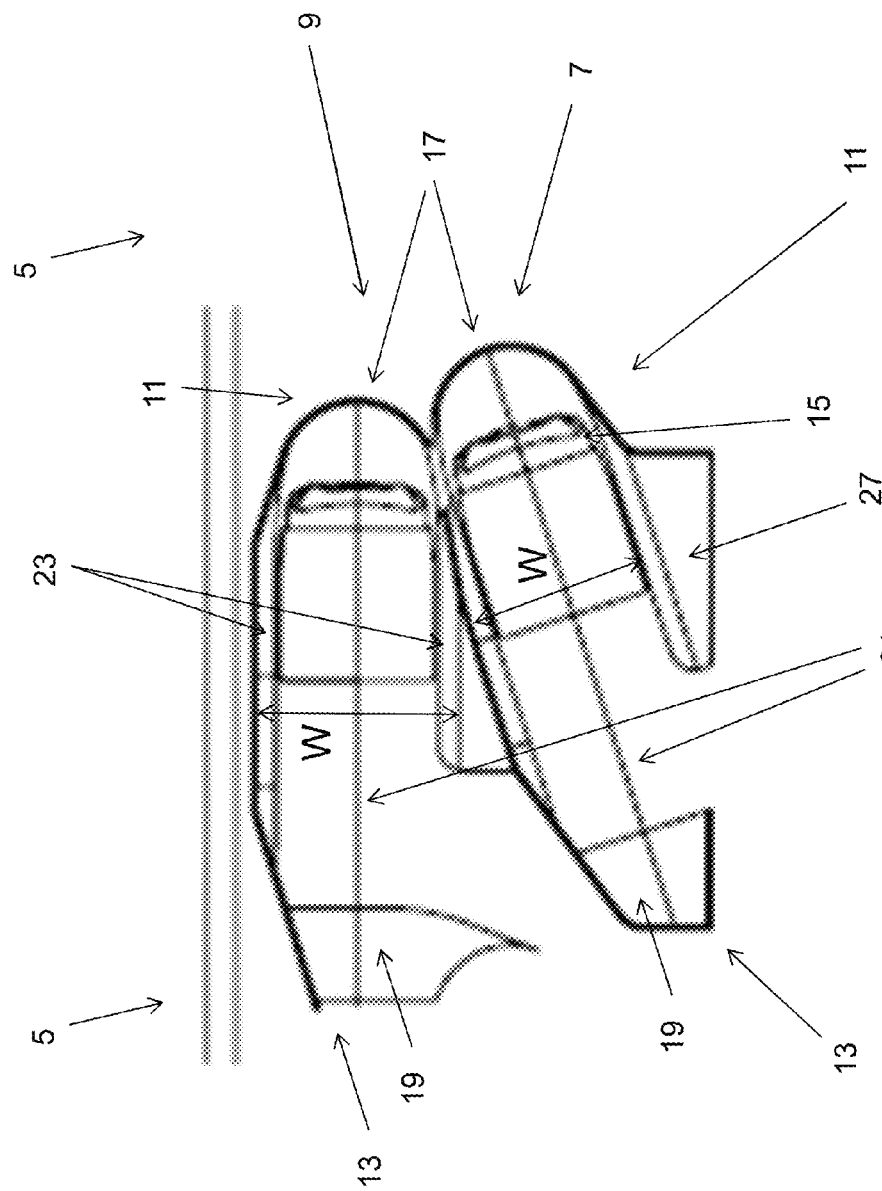

FIG. 1a shows a plan view of a seating arrangement according to a first embodiment of the invention, and FIG. 1b shows a pair of seating units from, one side of the aisle in isolation. The seating arrangement of the first embodiment is in an aircraft cabin 1 (partially shown) of a narrow body aircraft. The seating arrangement in FIG. 1a is a 2-2 formation and comprises two columns C of seat units, extending either side of a central aisle 3. Each column C comprises pairs of seat units 5 located directly behind one another in adjacent rows R.

Each pair of seat units 5 comprises an aisle-seat unit 7 which borders the aisle 3 to one side, and a non-aisle-seat unit 9 to the other side. The structure of each seat unit 7, 9 is broadly identical. For clarity, many of the features described below are only labelled on the right-hand image in FIG. 1b; however, the same labelling applies to the other seat units shown in the accompanying Figures. Each seat unit 7, 9 has a head-receiving end 11 and an opposing foot receiving end 13. Each seat unit comprises a passenger supporting surface made up of the seat back, head rest, seat pan and ottoman. The seat back and head-rest 15 of the seat in the seas unit 7, 9, and the shroud 17 extending behind these components, are located at the head-receiving end 11. The foot-receiving end 13 comprises a fixed ottoman 19. Each seat unit 7, 9 is configurable between a seating configuration (in which the seat is in a largely upright, orientation and the passenger is able to sit, for example for taxi, take-off and landing (TTOL)) and a lie-flat bed configuration (in which the seat forms a flat bed surface extending from the headrest 15 to the ottoman 19, on which the passenger may sleep). Lie-flat seats are well known, and may be operable between the two configurations in a number of different ways readily understood by the skilled person. The present invention may be applicable to lie-flat seats, and non-lie flat seats, regardless of the exact mechanism by which the seat units achieve the two configurations, or the degree to which they recline.

Each seat unit 7, 9 comprises a longitudinal axis 21 extending between the head-receiving end 11 and the foot-receiving end 13 of the seat unit, and substantially bisecting the seat unit. The longitudinal axis 21 is perpendicular to the width W of the seat unit.

The longitudinal axis 21 of the non-aisle-seat units 9 are substantially aligned with one-another (i.e. are in-line with one another). Such an arrangement is space-efficient with regard to the width of the cabin occupied by the non-aisle-seat units 9. Moreover, the non-aisle-seat units 9 are also positioned end-to-end such that the shroud 17 of one non-aisle-seat unit abuts the ottoman 13 of a non-aisle-seat unit 9 in the row R behind. Thus, the pitch, of the non-aisle-seat units (i.e. the distance between successive shrouds) is substantially equal to the length of the non-aisle-seat units (i.e. the distance between the shroud and the ottoman); such an arrangement is therefore also space-efficient with regard to the length of the cabin occupied by the non-aisle-seat units 9 because there is no so-called "dead-space" between the seat units.

In some seating arrangements of the prior art, it is necessary for a non-aisle-seat passenger to step over, or otherwise cross, the aisle-seat unit in order to access their seat. This reduces the feeling of privacy and personal space for the passengers in both seats. Some arrangements hare been suggested to mitigate this problem, but they have tended to come at the expense of seat packing efficiency (for example the seat units in adjacent rows are spaced apart).

In the first embodiment of the invention, the longitudinal axis 21 of the aisle-seat unit 7 in each pair 5 is angled relative to the longitudinal axis 71 of the non-aisle-seat unit 9 such that a passenger access path (shown by way of the light shaded region in FIG. 1a and a double-headed arrow 10) is provided, to enable the non-aisle-seat passenger to access their seat unit 9 without passing across the aisle-seat unit 7. Such an arrangement has been found to improve passenger privacy whilst also enabling a relatively high packing efficiency. In particular, the non-aisle-seat units 9 are able to be arranged end-to-end (see above) and "dead space" (shown as a dark shaded region in FIG. 1a) is only present, at the ends of each column C. In this first embodiment of the invention, the pitch of the aisle-seat units 7 (i.e. the distance in the longitudinal direction of the cabin between adjacent shrouds) is less than the length of each aisle-seat unit 7 (i.e. the distance along the longitudinal axis 21 of the seat unit 7, between the shroud and the ottoman). In other embodiments of the invention, the pitch of she aisle-seat units may be greater than the length of each aisle-seat unit. For example, in another embodiment of the invention, the length of the aisle seas units is 77.53 inches, but the pitch is 81 inches.

The passenger access path 10 to the non-aisle-seat unit 9 in one pair 5, is defined between the edge of the ottoman 18 of the aisle-seat unit 7 in the pair 5, and the rear surface of the shroud 17 of the aisle-seat unit 7 in a pair of seat units 1 in the row R in front. This provides a readily identifiable boundary to the passenger access path.

In the first, embodiment of the invention, the shrouds 17 of each seat unit are generally rounded and the aisle-seat units 7 are also offset from the respective non-aisle-seat unit 9, such that part of the shroud 17 of the aisle-seat unit 7 extends into the region behind the non-aisle-seat unit 9. The region behind the non-aisle-seat is readily identifiable. In the first embodiment of the invention, the region can be considered as being a region extending behind each seat unit 7, 9 along the longitudinal axis 21 of the seat unit, and having a width corresponding to the maximum width W of the surface of the seat unit, on which a passenger is accommodated (e.g. the outer width of the armrests 23). By arranging the aisle-seat, units 7 to be angled and also partly accommodated in the region behind the non-aisle-seat units 9, the arrangement is space-efficient, with regard to the width, of the cabin occupied by the pairs of seat units 5.

In the first embodiment of the invention the aisle-seat units 7 are angled at 18 degrees to the longitudinal axis 21 of the non-aisle-seat 9. Since the non-aisle-seat units are also parallel to the longitudinal axis 25 of the cabin, the aisle-seat units are also angled at 18 degrees to this cabin axis. Such an orientation has been round to be sufficient to provide above-mentioned advantages of the invention bat does not require the aisle-seat unit to meet the crashworthiness criteria of seats angled above 16 degrees.

In the first embodiment of the invention, the seat units 7, 9 are all forward facing and angled outwardly with respect to the longitudinal axis 21 of the non-aisle-seat units 9; the head-receiving ends 11 of the seat units 7, 9 in each pair 5 are proximal to one another, and the foot-receiving ends 13 of the seat units 7, 9 in each pair 5 are distal from one another. The ottoman 19 and a side table 27 of each aisle-seat unit 7 therefore border the aisle 3. The ottoman 19 and table 27 are at a height from the cabin floor of less than 25 inches (~635 mm), enabling the aisle 3 to be relatively narrow (as low as 15 inches (~381 mm). This can be beneficial in increasing the seat caching efficiency and/or allow more width per seat unit than would otherwise be the case for at wider aisle.

Figure 2B:
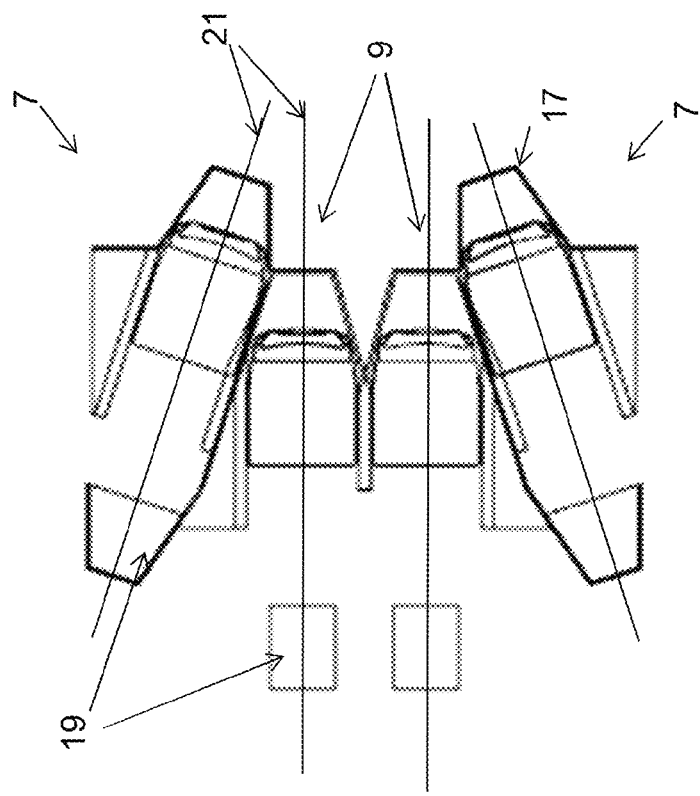
Figure 2B:
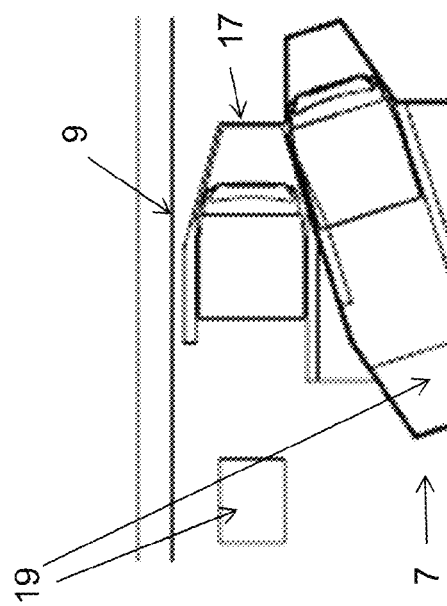

FIGS. 2a and 2b show an arrangement according to at second embodiment of the invention, on a wide body aircraft. The second embodiment is similar to the first embodiment except for the differences described below.

Firstly, the seating arrangement of the second embodiment is a 2-4-2 arrangement, in which a central column C having a width of four seat units 7, 9 (two pairs of seat units 5) extends along the longitudinal axis of the cabin 1, with aisles 3 extending either side thereof. Each row R of the central column C comprises two, inner, seat units 9 forming the non-aisle-seat units 9 of each pair 5 and two outer aisle-seat units 7 having longitudinal axes 21 angled relative to the longitudinal axis 21 of the non-aisle-seat units 9 (see FIG. 2b) such that a passenger access path 10 to the non-aisle-seat unit 9 is provided. In FIG. 1a and subsequent Figures, a passenger access path 10 is, for the sake of clarity, typically only labelled for one of the pairs of seat units. It will be appreciated however, that a passenger access path is, in fact, provided in the corresponding gap between a isle-seat units in the other pairs of seat units shown.

The seat units 7, 9 are of a different structure to those in the first embodiment. In particular, the shrouds 17 of each seat unit 7, 9 are of a generally trapezoidal shape (in plan view) tapering towards the ends of the seat unit. Such an arrangement enables the shroud and part of the passenger receiving portion of the aisles-seat units 7 to be located in the region behind the non-aisle-seat unit 9, thereby providing an especially width-efficient arrangement. The ottoman 19 of the aisle-seat units 7 is also tapered into a trapezoidal shape to maintain a reasonably wide passenger access route. The ottoman 19 of the non-aisle-seat unit 9 is generally rectangular and is shaped to closely fit against the shrouds 17 of the pair of seat units 5 in the row in front (see FIG. 2a; such that the seat units tessellate.

Figure 3A:
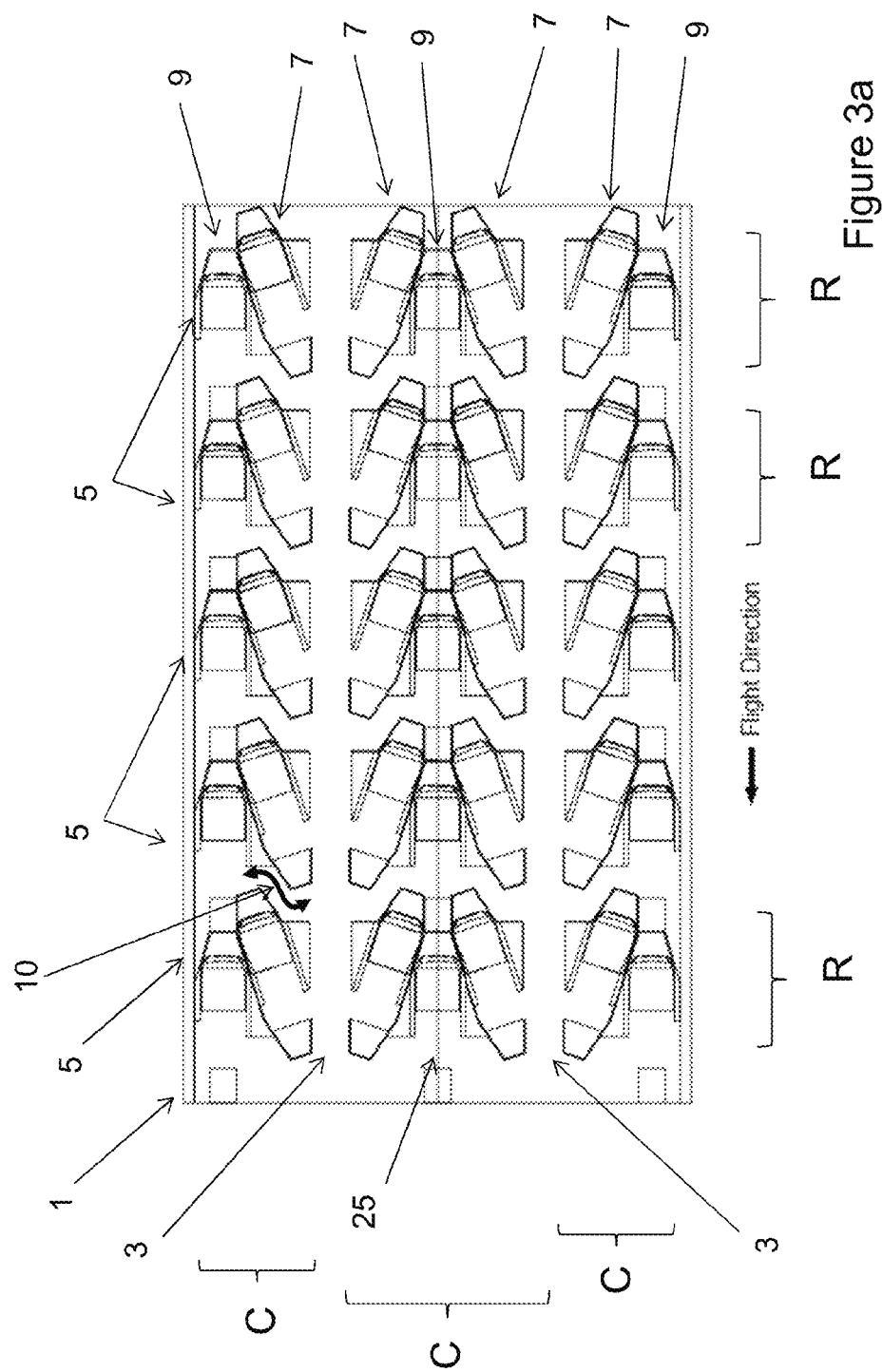
FIG. 3a is a plan view of a seating arrangement according to a third embodiment of the invention.
Figure 3B:
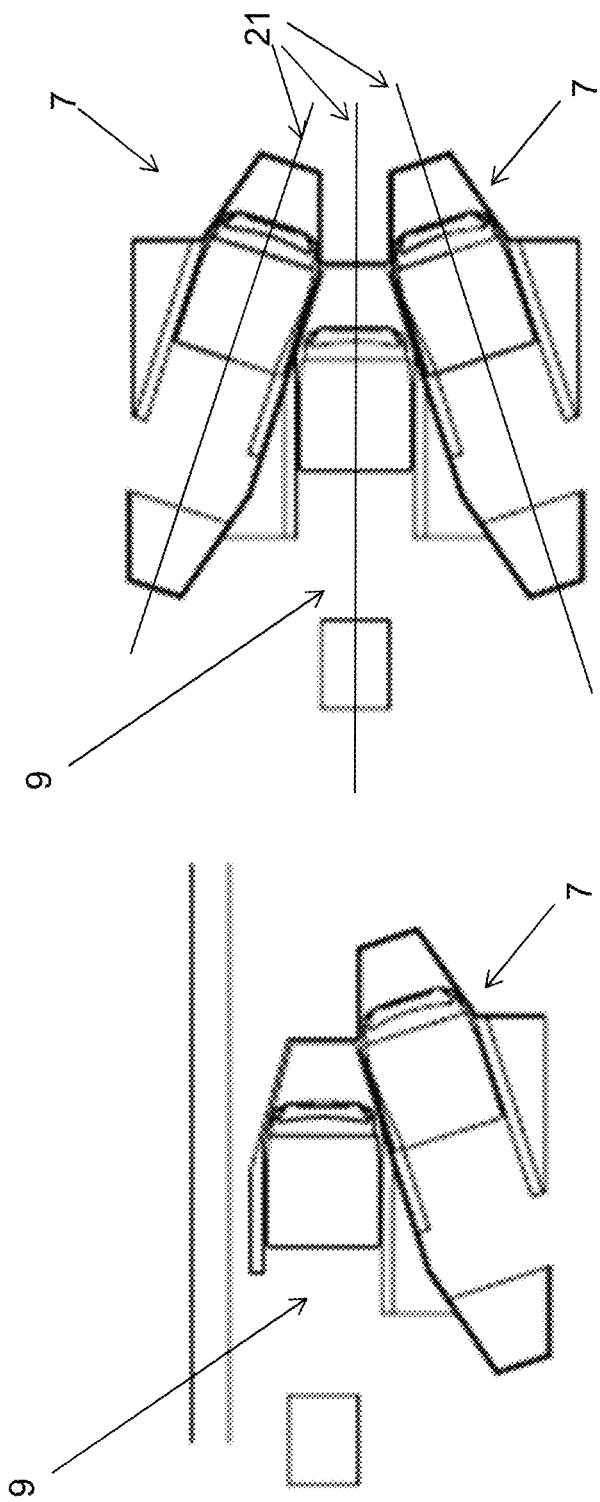

The third embodiment, shown in FIGS. 3a and 3b, is similar to the second embodiment except that it is a 2-3-2 arrangement in which the central column C comprises two aisle-seat-units 7 and a central non-aisle-seat unit 9 (the pairs or seat units 5 effectively share a common non-aisle-seat unit 9). The angling of the longitudinal axis of the aisle-seat units 7 creates two access paths 10 to the central non-aisle-seat unit 9.

FIG. 4a shows a fourth embodiment of the invention in which the seat units 7, 9 are arranged in a 2-2-2 formation. The pairs of seat units 5 in the central column C are identical in structure to those on the right-hand side of the cabin. Although the seat units in each row R of the central column of seat, units are accessible from the surrounding aisles 3 (reducing the need for the passenger access path), it is advantageous to provide pair of seat units 5 in accordance with the invention because of the relatively high, seat packing density provided, (see above), and to ensure uniform seating within the cabin 1.

Figure 4B:
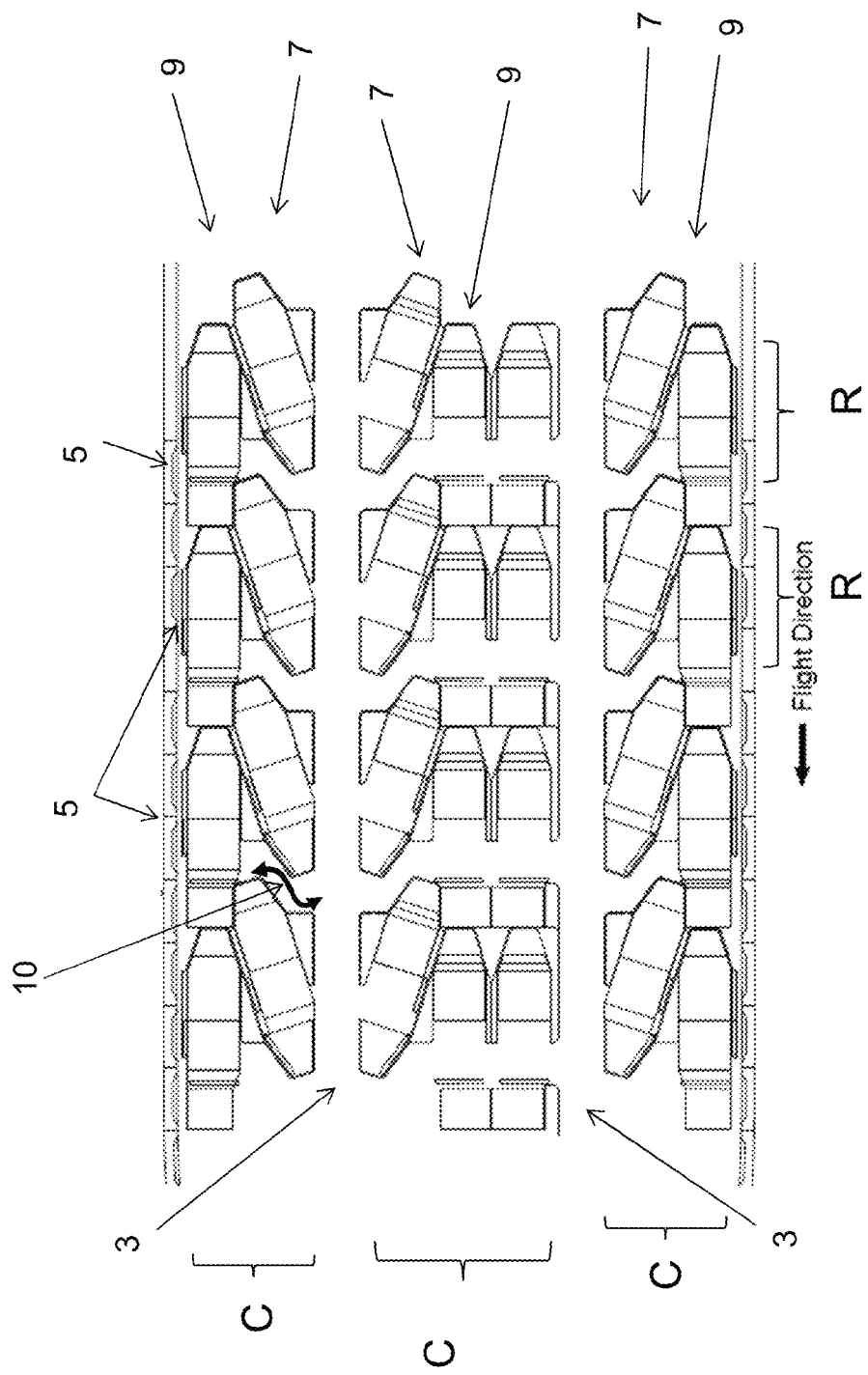
FIG. 4b is a plan view of a seating arrangement according to a variant of the fourth embodiment of the invention.

FIG. 4b shows a variant of the fourth embodiment of the invention in which the seat units 7, 3 are arranged in a 2-3-2 formation. The pairs of seat units 5 in the central column C are she same as those in FIG. 4a except that adjacent to the non-aisle-seat unity a further seat unit is also fitted. The central non-aisle-seat unit in the central column is accessible from the upper aisle 3 via either a passenger access path, or (less preferably) by stepping across the occupant of this further seat unit.

Figure 5B:
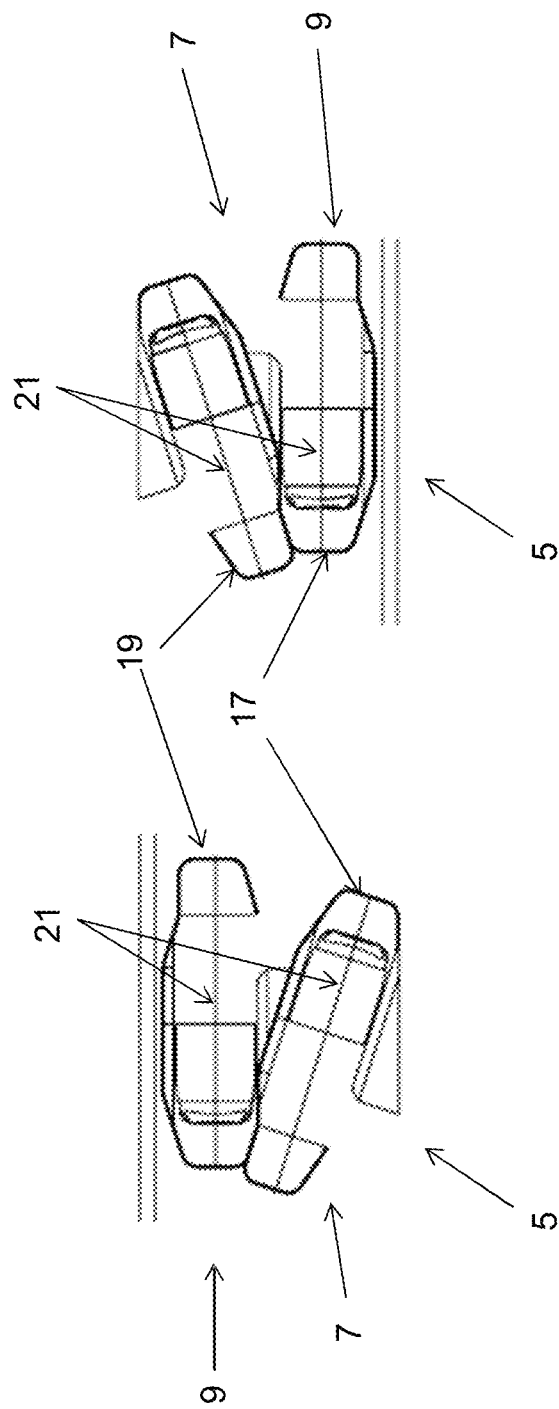
Figure 6A:
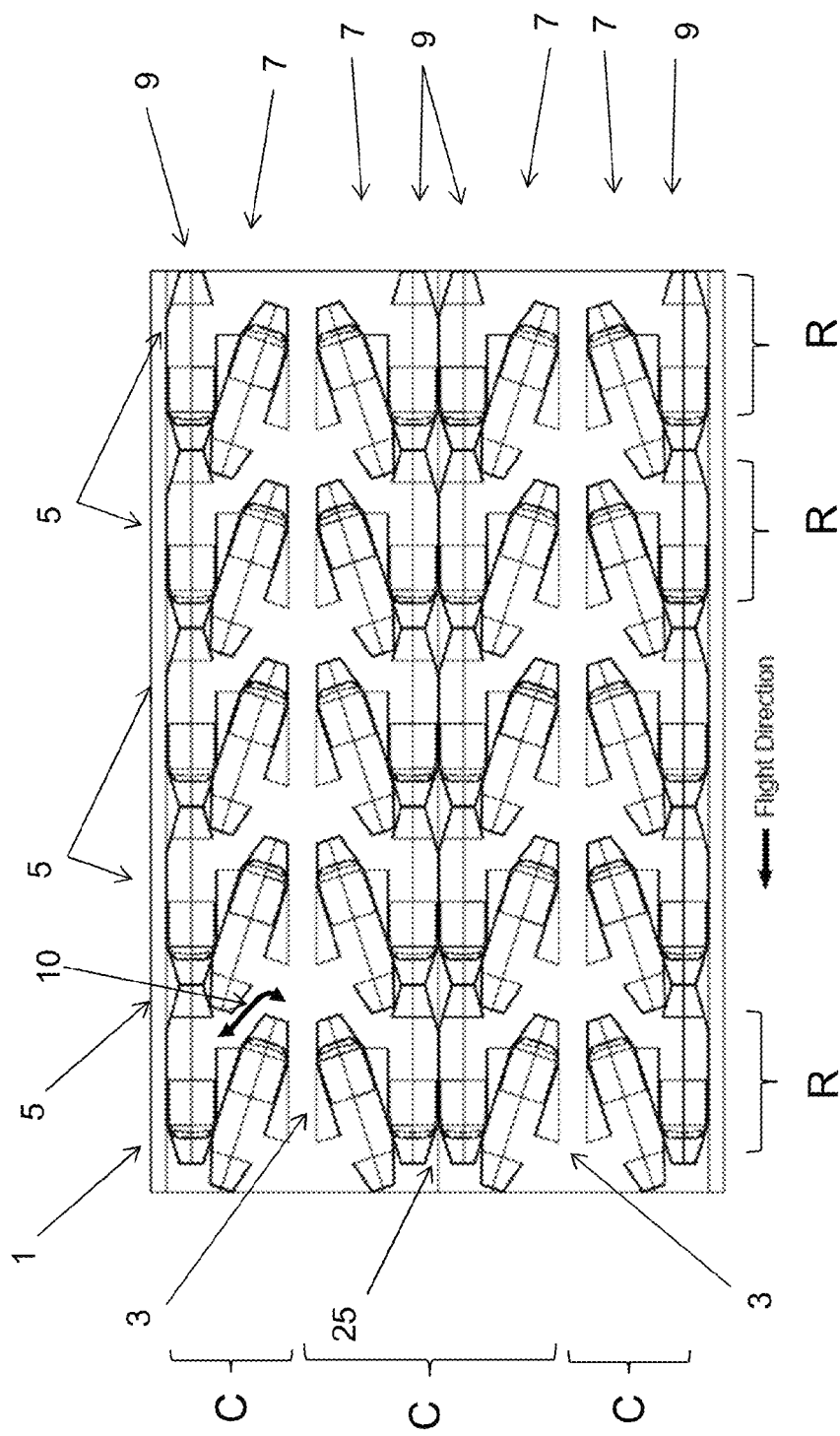
FIG. 6a is a plan view of a seating arrangement according to a sixth embodiment of the invention.
Figure 6B:
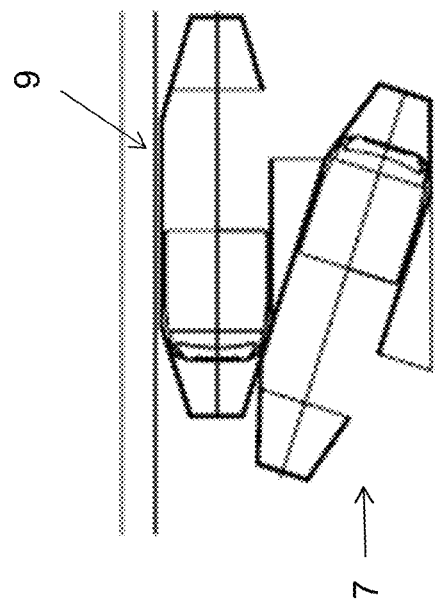
Figure 6B:
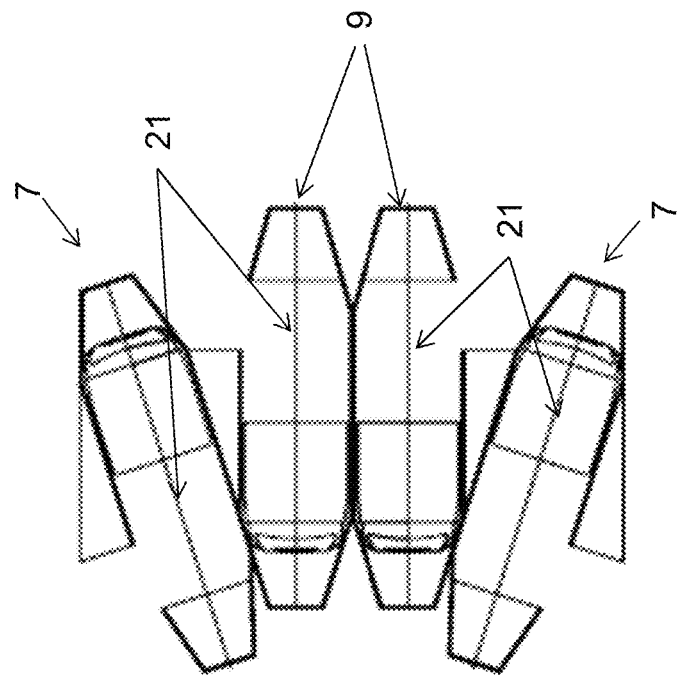
Figure 7A:
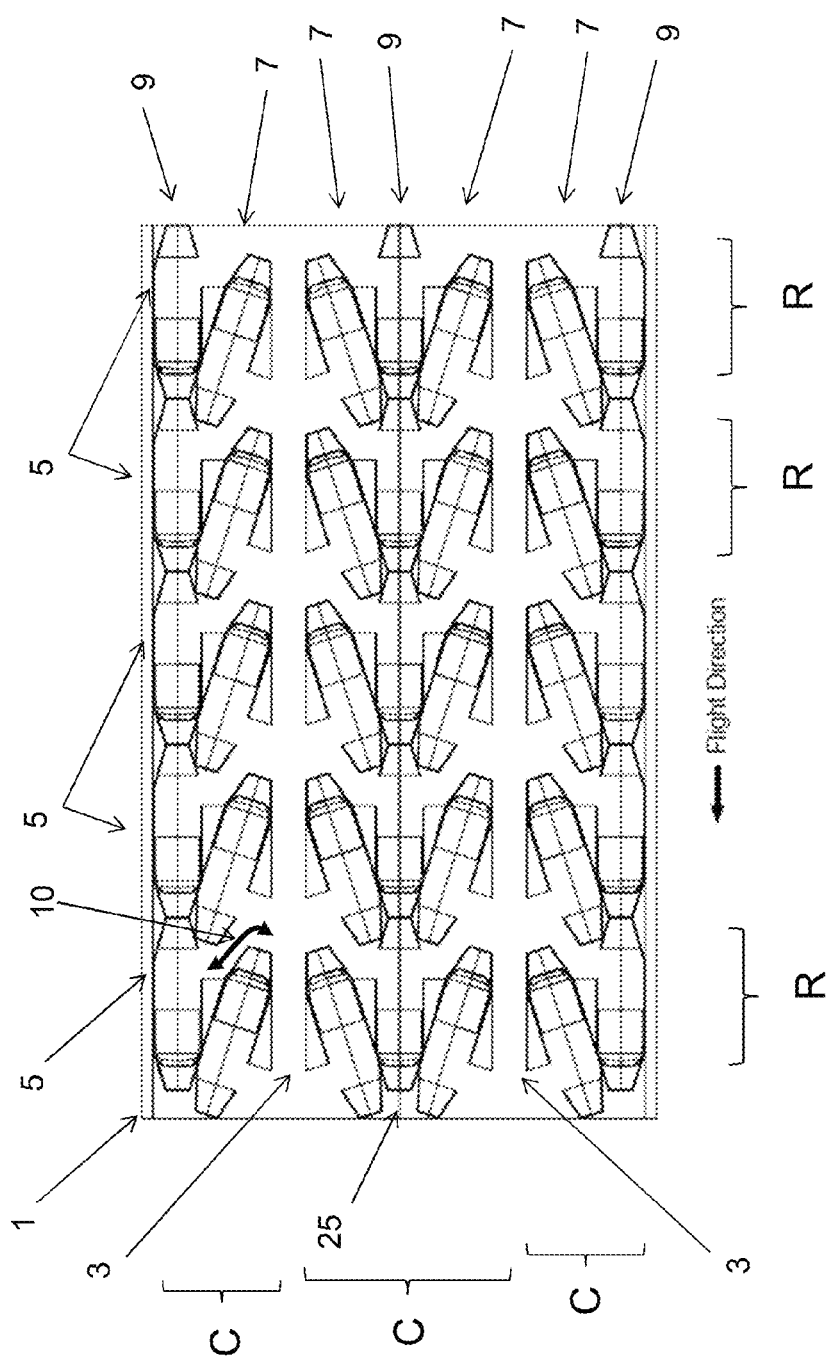
FIG. 7a is a plan view of a seating arrangement according to a seventh embodiment of the invention.
Figure 7B:
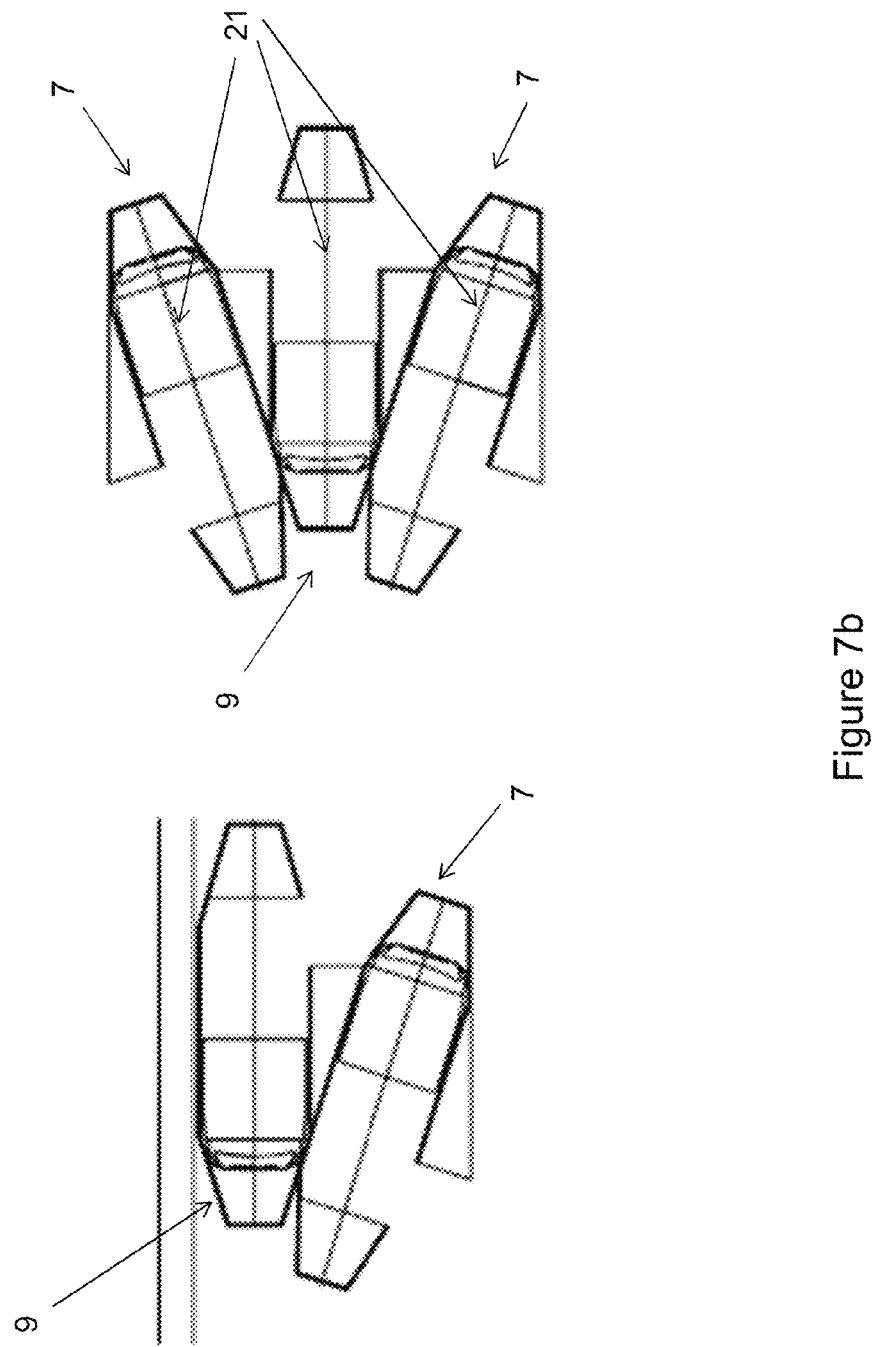
Figure 8:
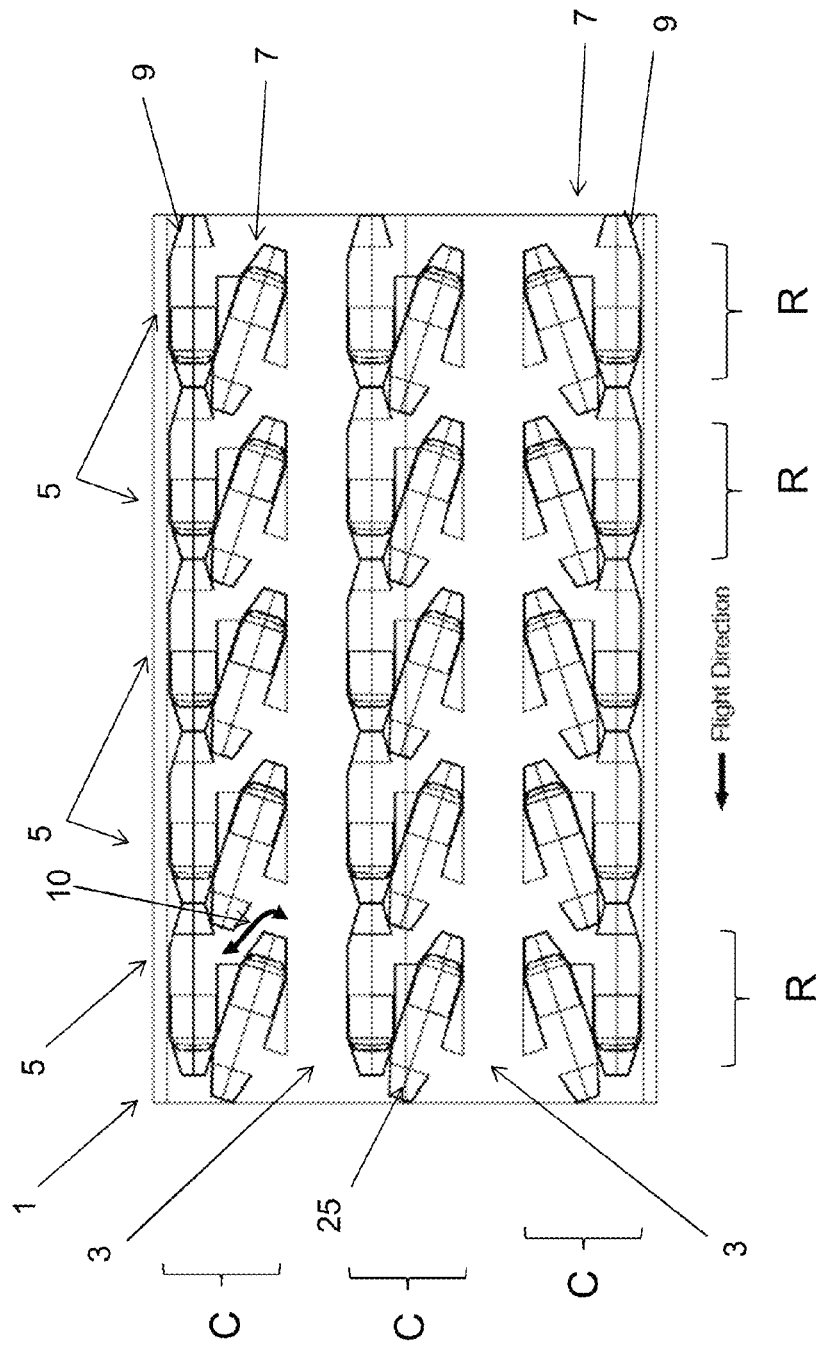
FIG. 8 is a plan view of a seating arrangement according to an eighth embodiment of the invention.

FIGS. 5a and 5b relate to yet another embodiment of the invention. The structure of the seat units 7, 9 is identical to those described with respect to the first embodiment of the invention. However, in contrast to the first embodiment of the invention, the seat units 7, 9 in each pair of seat units 5 face in opposing directions. Here specifically, the non-aisle-seat units 9 face rearward, and the aisle-seat units 7 face forward. The aisle-seat units 7 are angled inward relative to the longitudinal axis 21 of the non-aisle-seat unit 9, and are offset from the non-aisle-seat unit 3 such that the ottoman 19 of the aisle-seat unit 7 in a pair 5 extends into the region, behind the non-aisle-seat unit 3 of that pair 5. A passenger access path for the non-aisle-seat unit 9 in a pair 6 is defined between the rear of the shroud 17 of the aisle-seat unit 7 in that pair, and an edge of the ottoman 19 in the aisle-seat unit 7 of the row R behind.

FIGS. 6a to 8 show three further embodiments of the invention. These are 2-4-2, 2-3-2 and 2-2-2 arrangements that are broadly equivalent to the corresponding arrangements in the embodiments of FIGS. 2a to 4, except that the non-aisle-seat unit 9 in each pair faces rearward and the aisle-seat units 7 face forward (as described above with respect to FIGS. 5a and 5b).

Figure 9B:
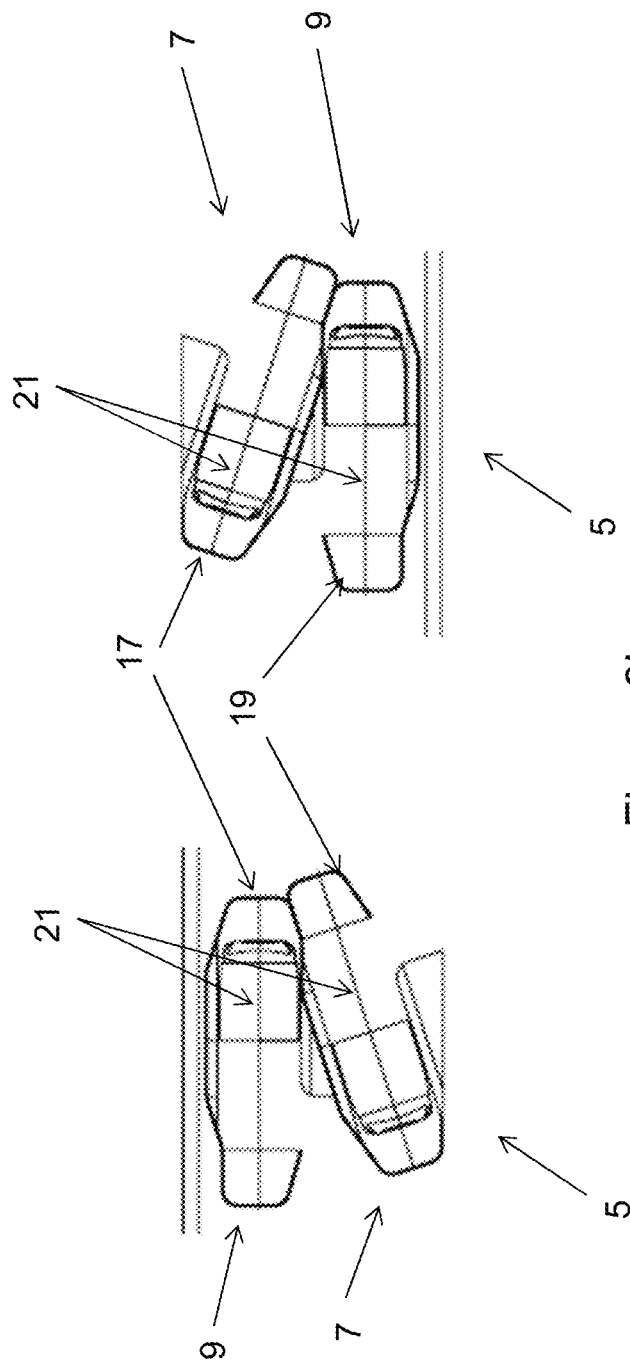
Figure 10A:
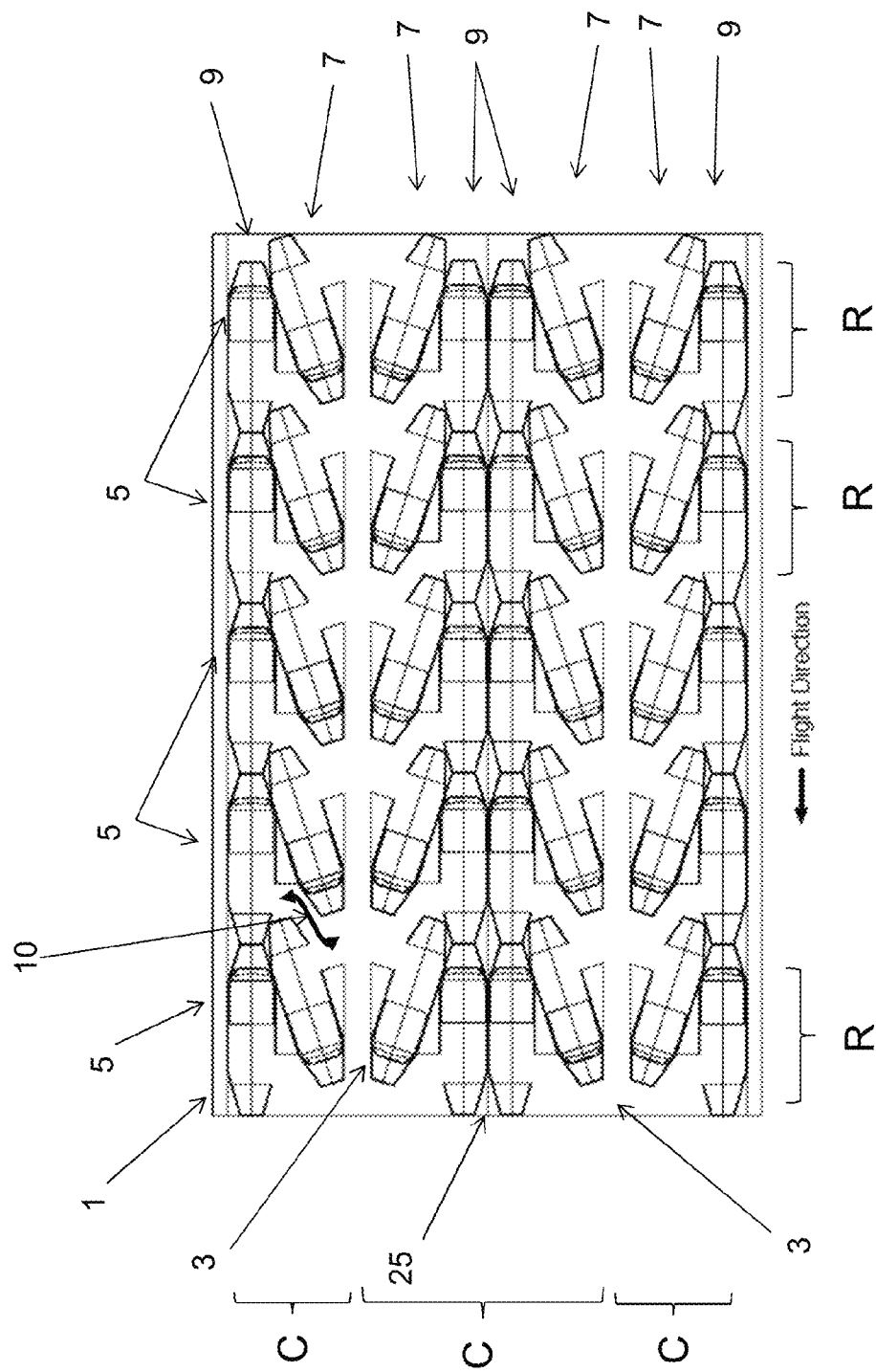
FIG. 10a is a plan view of a seating arrangement according to a tenth embodiment of the invention.
Figure 10B:
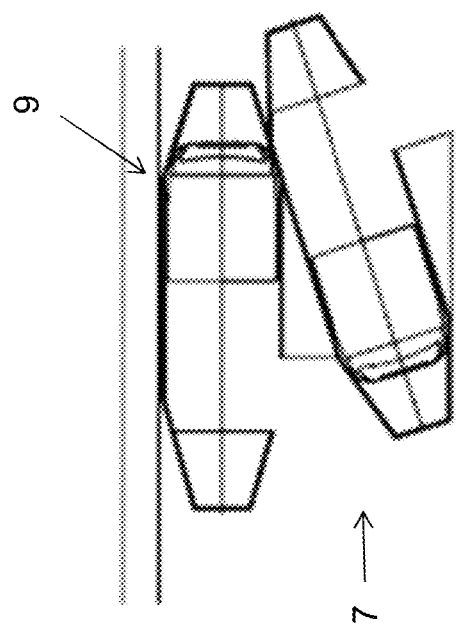
Figure 10B:
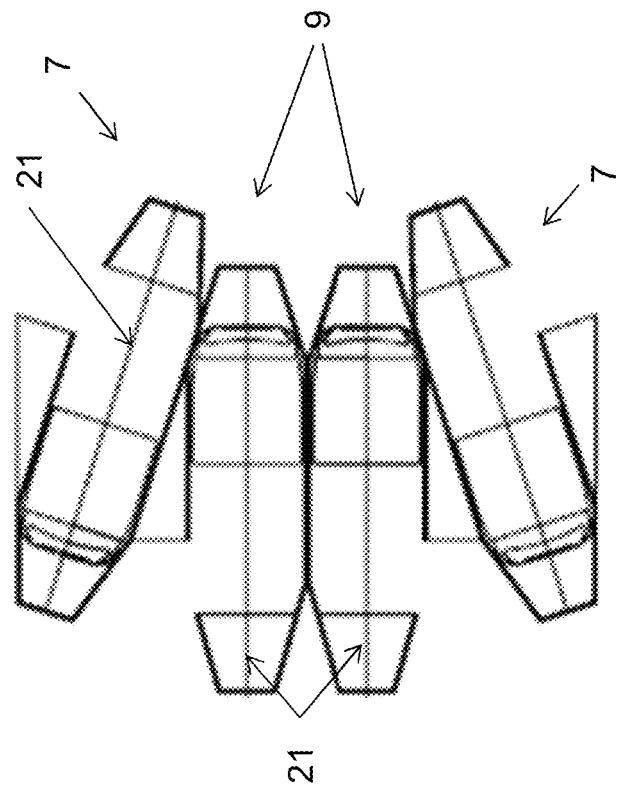
Figure 11A:
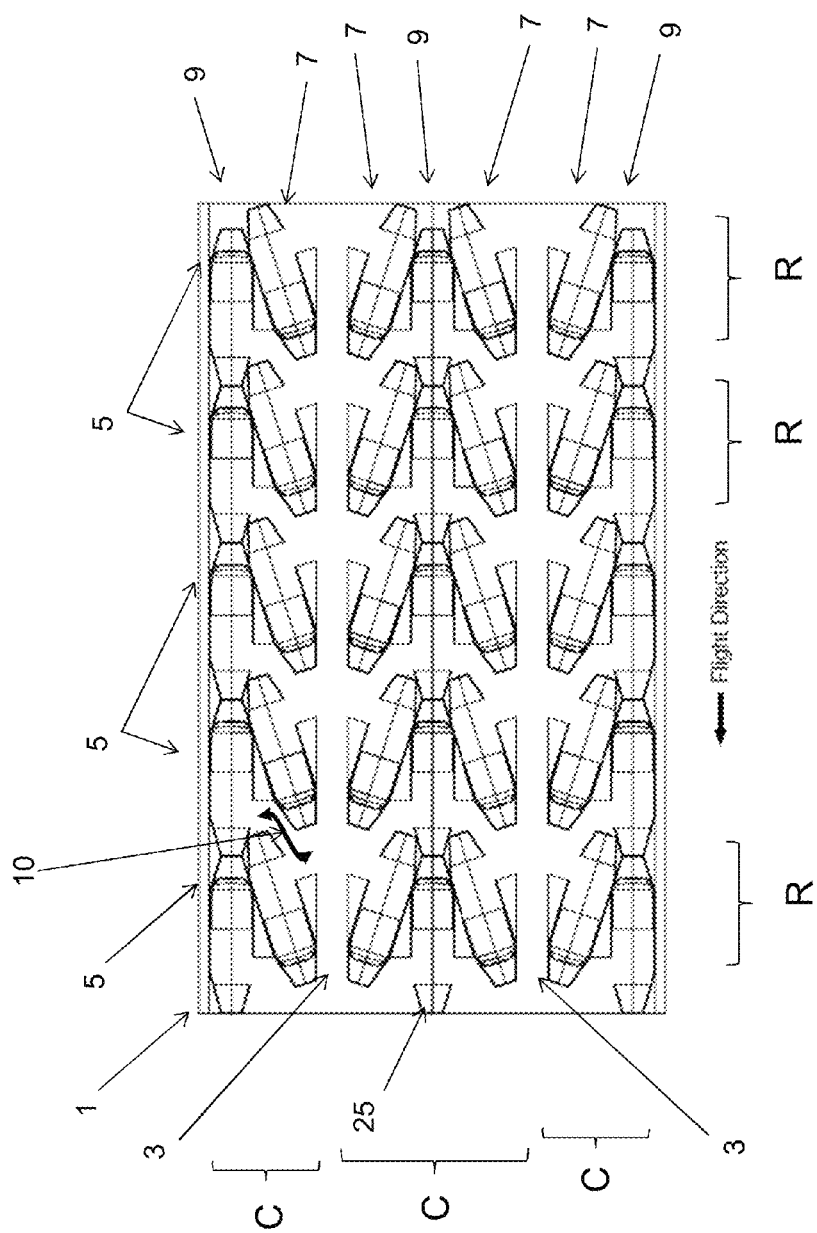
FIG. 11a is a plan view of a seating arrangement according to an eleventh embodiment of the invention.
Figure 11B:
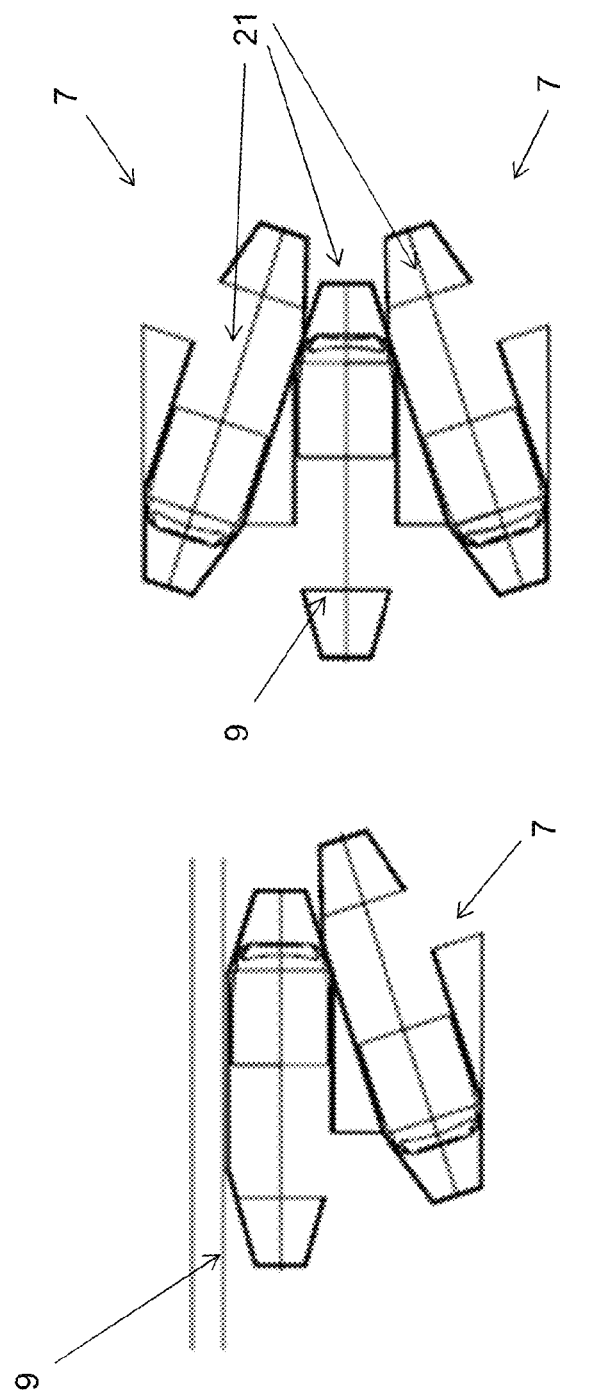
Figure 12:
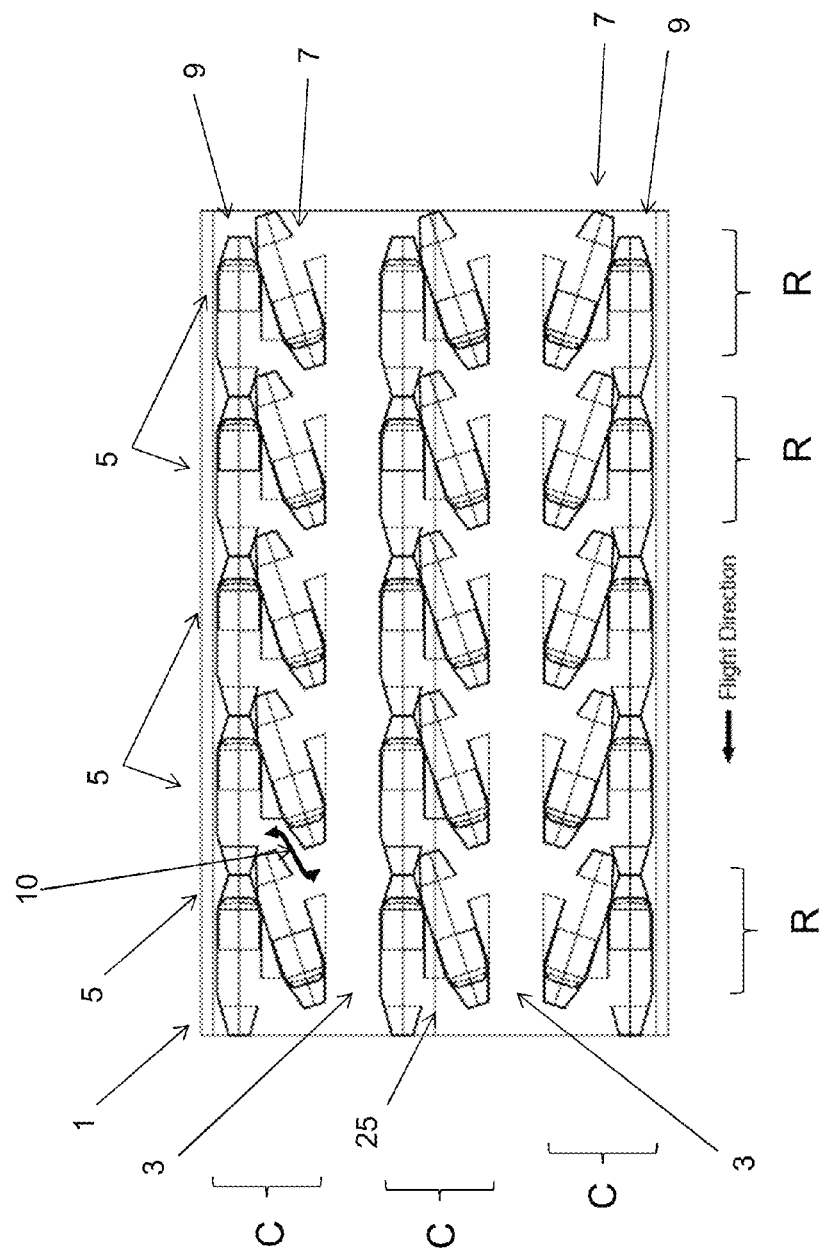
FIG. 12 is a plan view of a seating arrangement according to a twelfth embodiment of the invention.

FIGS. 9a and 9b show an arrangement according to another embodiment of the invention. This embodiment is similar to the fifth embodiment, expect that the non-aisle-seat units 9 face forwards, and the aisle-seat units 7 face rearwards. In common with the fifth embodiment, the aisle-seat units 7 are angled inward relative to true longitudinal axis 21 of the non-aisle-seat unit 9, and offset from the non-aisle-seat 9 such that the ottoman 19 of the aisle-seat unit 7 in a pair 5 extends into the region behind the non-aisle-seat unit 9 of that pair 5. A passenger access path for the non-aisle-seat unit 9 in a pair 5 is defined between the rear of the shroud 17 of the aisle-seat unit 7 in that pair 5, and an edge of the ottoman 19 in the aisle-seat unit 7 of the row R in-front.

FIGS. 10a to 12 show three further embodiments of the invention. These are 2-4-2, 2-3-2 and 2-2-2 arrangements that are broadly equivalent to the corresponding arrangements in the embodiments of FIGS. 6a to 8, except that the non-aisle-seat unit in each pair faces forward and the aisle-seat units face rearward (as described above with respect to FIGS. 9a and 9b).

Figure 13:
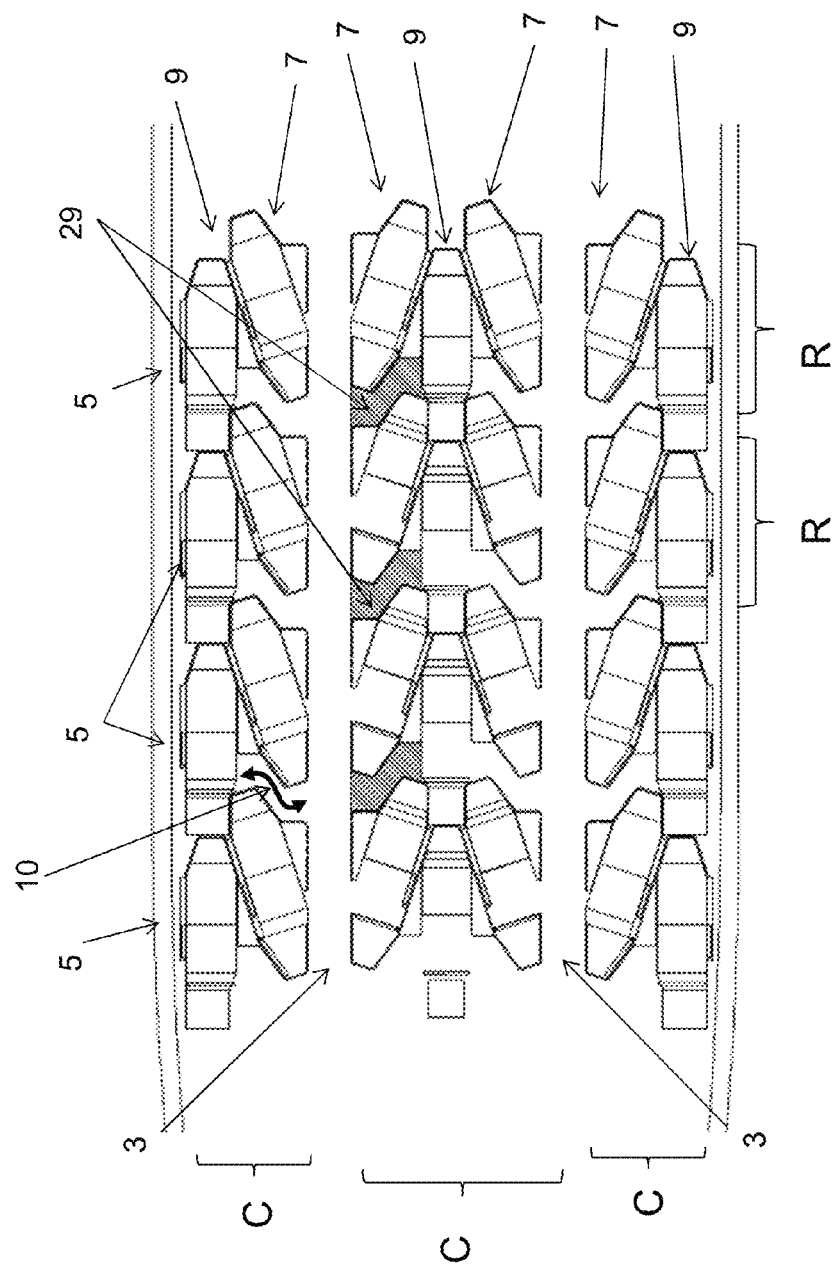
FIG. 13 is a plan view of a seating arrangement according to another embodiment of the invention.
Figure 14:
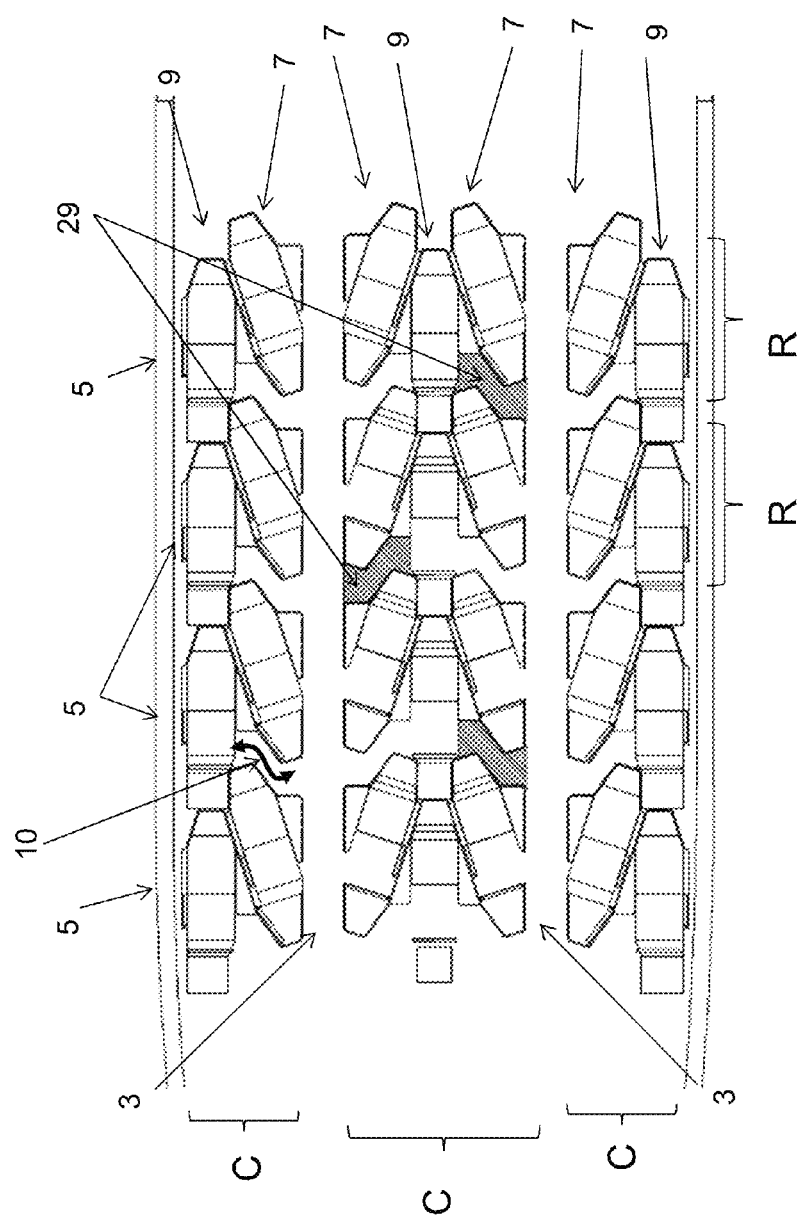
FIG. 14 is a plan view of a seating arrangement according to yet another embodiment of the invention.

FIGS. 13 and 14 show two variations on the embodiment of FIG. 3a. In the embodiment of FIGS. 13 and 14, it has been recognized that only one passenger access path need be provided for each of the non-aisle-seat units 9 in the central column C. Accordingly, in FIG. 13 the space that would be occupied by the passenger access path along one side of the central column is instead filled in and area as a table surface 29 (that table surface is shown in closely-hashed lines). FIG. 14 shows a preferred embodiment in which the passenger access path is provided between alternate pairs of seats units 2. This is generally preferred over the embodiment on FIG. 13 because it ensures a more even distribution of passengers on each side of the column when those passengers need to access their seal units.

Figure 15:
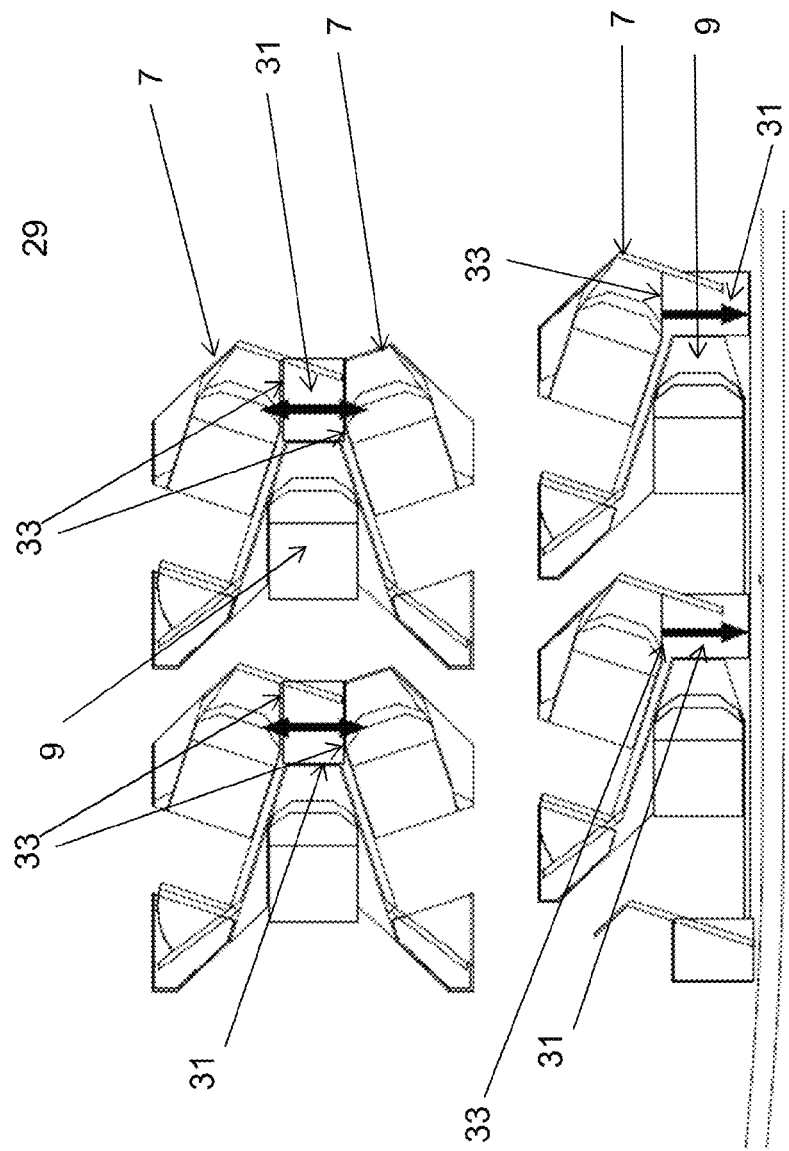
FIG. 15 is a plan view of part of a seating arrangement according to another embodiment of the invention.

FIG. 15 shows another embodiment of the invention which is, again, similar to that of FIG. 3a. However, in the embodiment of FIG. 15 the ottoman of the non-aisle-seat 9 is partially enclosed by virtue of being covered by an ancillary support surface 31. This ancillary support surface 31 is useable as a table top by the passenger in the aisle-seat unit 7 (denoted by the arrows in the pairs of seat, units that are adjacent the sidewall in FIG. 15). In the central, column of seat units, both of the aisle-seat units 7 can access the ancillary surface 31 above the ottoman (denoted by the double-headed arrow). Each of those seat units 7 also has a moveable screen 33 for selectively providing/preventing access to the ancillary surface 31. The screen 33, when in place, can act to screen the passenger in cane aisle-seat unit 7 from the view of the passenger in the other aisle-seat unit 7.

Figure 16:
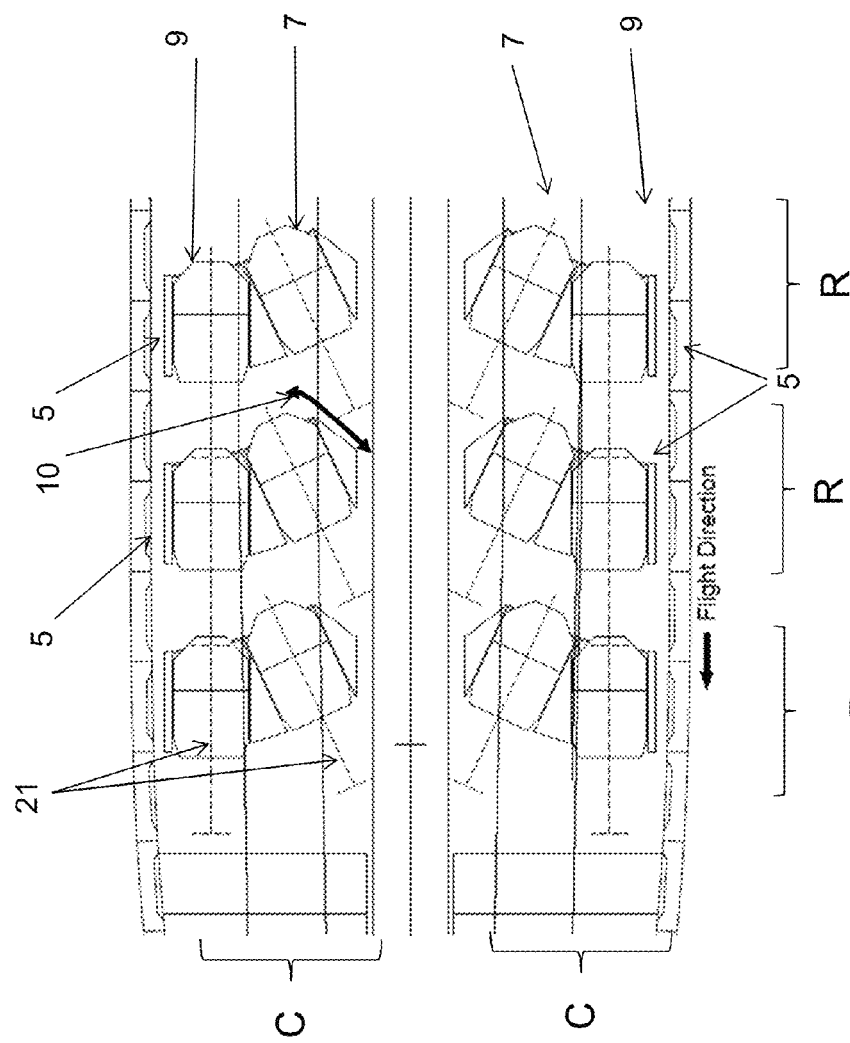
FIG. 16 is a plan view of a seating arrangement according to an embodiment of the invention in which the seat units are configurable between a seating configuration and a reclined (but not lie-flat) configuration.

Whilst the above-mentioned embodiments relate to lie-flat seat units, the present invention may also be applicable to non-lie flat seating, such as reclinable seating. FIG. 16 shows a further embodiment of the invention. Each seat unit 7, 9 comprises a seat defining a passenger supporting surface. The passenger supporting surface comprises a seat back, seat, pan, and leg rest. Side furniture is also provided adjacent the passenger supporting surface, such as the triangular side tables shown on the side of each seat unit. Each seat is reclinable from an upright configuration to a reclined (but not-lie-flat) configuration in which the seat back reclines slightly and the leg rest lifts up. In FIG. 16 the seat units 7, 9 are all shown from above in their upright configuration. Their maximum forward extent when reclined is shown by the T-shaped marker on the longitudinal axis 21 extending through each seat unit. For the sake of clarity, the access path 10, and the axis 21 and ether parts of the seat units are not labelled on ail the seat units 7, 9 in FIG. 16; nevertheless it will be appreciated that each seat unit does of course comprise such features.

The length of the seat units is the distance between the rearmost part of the seat back and the end of the leg rest, when the seat is in the reclined configuration (i.e. between the back of the seat back and the T-shaped marker). As visible in FIG. 16, the pitch of the seat units is such that the leg rest of each non-aisle-seat unit 9 when reclined, extends beneath the seat hack of the non-aisle-seat unit 9 in front. Thus, the pitch of the non-aisle-seat units is less than the length of those units.

In common with the above-mentioned embodiments of the invention that incorporate lie-flat seats, the longitudinal axis 21 of the aisle-seat unit 7 in each pair of units is angled to the longitudinal, axis 21 of the non-aisle-seat unit 9. Thus a passenger access path 10 is provided to enable the passenger of the non-aisle-seat unit to access the aisle 3 without undue invasion of the personal, space of the passenger in the aisle-seat unit.

Figure 17:
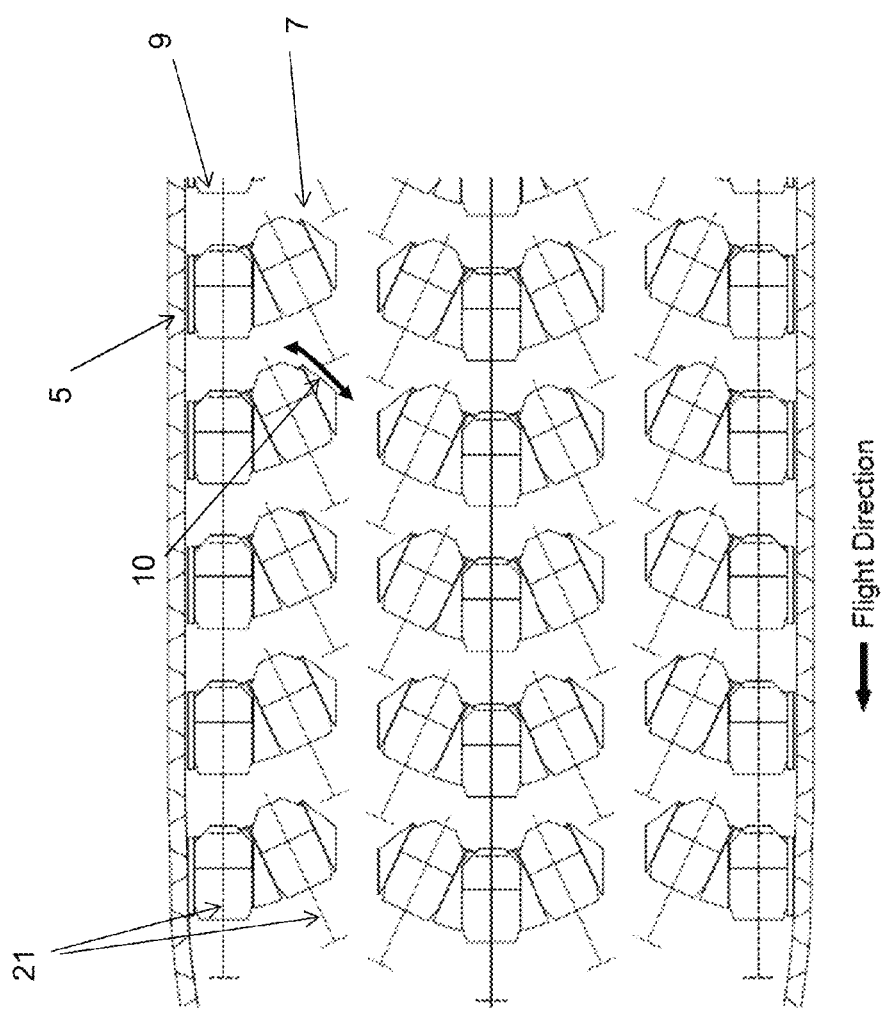
FIGS. 17 and 18 are two further embodiments in which the seat units are configurable between a seating configuration and a reclined (but not lie-flat) configuration.
Figure 18:
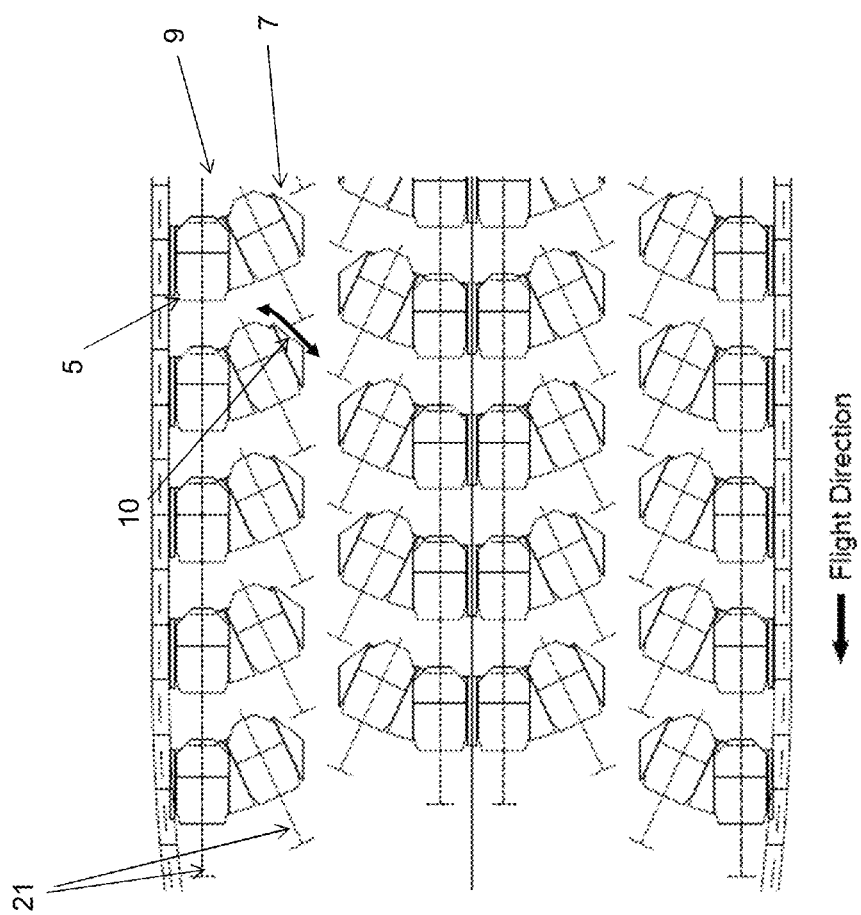

FIGS. 17 and 18 show pairs of seat units that are substantially identical to those in FIG. 16, but which are instead arranged in 2-3-2 and 2-4-2 arrangements that are equivalent to chose for the lie-flat seat unit in FIGS. 3a and 2a respectively.

Whilst the present invention has been described and illustrated with reference to particular embodiments, it will be appreciated by those of ordinary skill in the art that the invention lends itself to many different variations not specifically illustrated herein. For example the aisle-seat may be angled to the non-aisle-seat at a lesser or greater angle than that shown in the Figures.

Where in the foregoing description, integers or elements are mentioned which, have known, obvious or foreseeable equivalents, then such equivalents are herein incorporated as if individually set forth. Reference should be made to the claims for determining the true scope of the present invention, which should be construed so as to encompass arty such equivalents. It will also be appreciated by the reader that integers or features of the invention that are described as preferable, advantageous, convenient or the like are optional and do not limit the scope of the independent claims.

The invention claimed is:

1. A passenger seating arrangement in an aircraft cabin, the seating arrangement comprising a multiplicity of substantially identical pairs of seat units, the pairs of seat units being located directly behind one another, each seat unit having a longitudinal axis, and each pair of seat units comprising an aisle-seat unit bordering an aisle to one side, and a non-aisle-seat unit positioned to the other side of the aisle-seat unit, each seat unit being configurable between a seating configuration and a flat-bed configuration, and the longitudinal axes of the non-aisle-seat units being arranged in-line with one another and being substantially parallel to the longitudinal axis of the aircraft cabin, all the aisle-seat units facing in the same, first, direction, and all the non-aisle seat units facing in the same, second, direction, wherein and the longitudinal axis of the aisle-seat unit of each pair of seat units is angled relative to the longitudinal axis of the non-aisle-seat unit, so as to provide a passenger access path, at least part of the passenger access path being angled relative to the longitudinal axis of the non-aisle-seat units and linking the non-aisle-seat unit of a pair, with the aisle.

2. A passenger seating arrangement according to claim 1, wherein the pitch of the non-aisle-seat units is less than, or substantially equal to, the length of each non-aisle-seat unit.

3. A passenger seating arrangement according to claim 1, wherein the pitch of the aisle-seat units is less than a maximum pitch value, the maximum pitch value being equal to the length of each aisle seat unit plus the minimum width of a pathway for a passenger to use.

4. A passenger seating arrangement according to claim 1, wherein the aisle-seat unit in each pair of seat units is offset from the non-aisle-seat unit, such that the aisle-seat unit extends, or is extendable, beyond one end of the non-aisle-seat unit.

5. A passenger seating arrangement according to claim 1, wherein the passenger access path adjoins a side of the non-aisle-seat unit.

6. A passenger seating arrangement according to claim 1, wherein the seat units are substantially forward facing and the aisle-seat units are angled outwardly relative to the non-aisle-seat units.

7. A passenger seating arrangement according to claim 1, wherein the aisle-seat unit and the non-aisle-seat unit in each pair face in opposite directions.

8. A passenger seating arrangement according to claim 1, wherein the non-aisle-seat units are adjacent a sidewall of the aircraft cabin.

9. A passenger seating arrangement according to claim 1, wherein the non-aisle-seat units and the aisle-seat units are substantially the same length.

10. A passenger seating arrangement according to claim 1, wherein the distance between adjacent rows of non-aisle seat units is 8 inches or less.

11. A passenger seating arrangement according to claim 1, wherein the non-aisle-seat units are arranged substantially end-to-end.

12. A passenger seating arrangement according to claim 1, wherein each aisle-seat unit has a foot-receiving end and a head-receiving end, the foot-receiving end being tapered.

13. A passenger seating arrangement according to claim 12, wherein the head-receiving end of each aisle-seat unit is tapered.

14. A passenger seating arrangement according to claim 13, wherein the angled part of the passenger access path passes between the tapered head-receiving end of one aisle-seat unit and the tapered foot-receiving end of an aisle-seat unit in the row directly behind.

15. A seating assembly for use in an aircraft cabin, the seating assembly comprising a pair of seat units,
   each seat unit having a longitudinal axis, and the pair of seat units comprising a first seat unit for bordering an aisle to one side, and a second seat unit positioned to the other side of the first seat unit,
   each seat unit being configurable between a seating configuration and a flat-bed configuration, and
   wherein the second seat unit is adapted to be installed in the cabin such that the longitudinal axis of the second seat unit is in-line with the longitudinal axis of a second seat unit of a corresponding seat assembly in an row directly behind the seat assembly, and is substantially parallel to the longitudinal axis of the aircraft cabin
   and the longitudinal axis of the first seat unit is angled relative to the longitudinal axis of the second seat unit,
   such that when the seating assembly is located in an aircraft cabin with corresponding, identical, seating assemblies in the rows directly behind and in front of the seat assembly, and the second seat units in each of those assemblies have their longitudinal axes in-line with one another such that all the first seat units facing in the same, first, direction, and all the second units facing in the same, second direction,
   a passenger access path is provided, the passenger access path passing between the first seat unit of the seat assembly and the first seat unit of the seat assembly in the row either in front or behind, at least part of that passenger access path being angled relative to the longitudinal axis of the second seat unit, for linking the second seat unit with the aisle.

16. A passenger seating arrangement in an aircraft cabin, the seating arrangement comprising a multiplicity of substantially identical pairs of seat units, the pairs of seat units being located directly behind one another,
   each seat unit having a longitudinal axis, and each pair of seat units comprising a first seat unit and a second seat unit positioned to one side of the first seat unit, and
   all the first seat units facing in the same, first, direction, and all the second seat units facing in the same, second, direction, and
   wherein the longitudinal axis of the second seat unit is parallel with the longitudinal axis of the cabin and the longitudinal axis of the first seat unit is angled relative to the second seat unit.

17. A passenger seating arrangement according to claim 16, wherein the second seat unit is adjacent a sidewall of the aircraft cabin.

18. A passenger seating arrangement according to claim 16, wherein the second seat unit and the first seat unit are substantially the same length.

* * * * *